(12) United States Patent
Veros et al.

(10) Patent No.: US 12,529,215 B2
(45) Date of Patent: *Jan. 20, 2026

(54) FAUCET INCLUDING A WIRELESS CONTROL MODULE

(71) Applicant: Delta Faucet Company, Indianapolis, IN (US)

(72) Inventors: Michael J. Veros, Carmel, IN (US); Kurt Judson Thomas, Indianapolis, IN (US); Jeremy Schmitt, Fishers, IN (US); Randy L. Schneider, II, Carmel, IN (US); Joel D. Sawaski, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/469,092

(22) Filed: Sep. 18, 2023

(65) Prior Publication Data

US 2024/0052614 A1    Feb. 15, 2024

Related U.S. Application Data

(63) Continuation of application No. 16/765,650, filed as application No. PCT/US2018/062258 on Nov. 21, 2018, now Pat. No. 11,761,184.

(Continued)

(51) Int. Cl.
*E03C 1/05* (2006.01)
*F16K 11/00* (2006.01)

(Continued)

(52) U.S. Cl.
CPC ............ *E03C 1/057* (2013.01); *F16K 19/006* (2013.01); *G01F 15/005* (2013.01);
(Continued)

(58) Field of Classification Search
CPC ...................................... E03C 1/057
See application file for complete search history.

(56) References Cited

U.S. PATENT DOCUMENTS 4,102,526 A    7/1978   Hargraves
4,606,085 A    8/1986   Davies
(Continued)

FOREIGN PATENT DOCUMENTS

CN    102072339    5/2011
CN    202040379   11/2011
(Continued)

OTHER PUBLICATIONS

International Search Report and Written Opinion received for PCT Patent Application No. PCT/US2018/062258, dated Mar. 29, 2019, 13 pages.

*Primary Examiner* — Reinaldo Sanchez-Medina
(74) *Attorney, Agent, or Firm* — Bose McKinney & Evans LLP

(57) ABSTRACT

An electronic faucet including a wireless module facilitating remote control of an electrically operable valve. Illustratively, the wireless module includes a body defining a fluid passageway in fluid communication with the electrically operable valve, and a receiver configured to receive wireless signals from a remote transmitter. The remote transmitter may comprise a voice recognition and conversion device to facilitate voice control of the electrically operable valve.

36 Claims, 12 Drawing Sheets

Related U.S. Application Data

(60) Provisional application No. 62/589,540, filed on Nov. 21, 2017.

(51) Int. Cl.
    *G01F 15/00*     (2006.01)
    *G05D 7/06*     (2006.01)
    *G10L 15/22*     (2006.01)
    *H04W 84/12*     (2009.01)

(52) U.S. Cl.
    CPC ............ *G05D 7/0617* (2013.01); *G10L 15/22* (2013.01); *G10L 2015/223* (2013.01); *H04W 84/12* (2013.01)

(56) References Cited

U.S. PATENT DOCUMENTS

| | | |
|---|---|---|
| 4,625,896 A | 12/1986 | Rocchell |
| 4,735,357 A | 4/1988 | Gregory et al. |
| 4,762,273 A | 8/1988 | Gregory et al. |
| 4,898,360 A | 2/1990 | Vonhayn et al. |
| 4,909,435 A | 3/1990 | Kidouchi et al. |
| 4,915,347 A | 4/1990 | Iqbal et al. |
| 4,945,943 A | 8/1990 | Cogger |
| 4,968,152 A | 11/1990 | Bergmann |
| 5,092,560 A | 3/1992 | Chen |
| 5,184,642 A | 2/1993 | Powell |
| 5,199,118 A | 4/1993 | Cole |
| 5,199,790 A | 4/1993 | Pawelzik et al. |
| 5,481,237 A | 1/1996 | Sarfati et al. |
| 5,584,466 A | 12/1996 | Fukano et al. |
| 5,603,355 A | 2/1997 | Miyazoe et al. |
| 5,625,908 A | 5/1997 | Shaw |
| 5,699,833 A | 12/1997 | Tsataros |
| 5,765,242 A | 6/1998 | Marciano |
| 5,868,311 A | 2/1999 | Cretu-Petra |
| 5,911,240 A | 6/1999 | Kolar et al. |
| 5,915,417 A | 6/1999 | Diaz et al. |
| 5,941,282 A | 8/1999 | Suzuki et al. |
| 5,944,255 A | 8/1999 | Shirmohamadi |
| 5,979,493 A | 11/1999 | Simpkins, Jr. |
| 5,988,588 A | 11/1999 | Allen et al. |
| 5,988,772 A | 11/1999 | Hashida |
| 5,992,461 A | 11/1999 | Gilmore et al. |
| 6,098,653 A | 8/2000 | Kobow et al. |
| 6,125,482 A | 10/2000 | Foster |
| 6,164,323 A | 12/2000 | Smith et al. |
| 6,317,717 B1 | 11/2001 | Lindsey et al. |
| 6,336,818 B1 | 1/2002 | Bayer |
| 6,382,257 B2 | 5/2002 | Mead et al. |
| RE37,888 E * | 10/2002 | Cretu-Petra ............. E03C 1/057 236/12.12 |
| 6,619,320 B2 | 9/2003 | Parsons |
| 6,786,238 B2 | 9/2004 | Frisch |
| 6,863,254 B2 | 3/2005 | Altenrenger et al. |
| 7,011,113 B2 | 3/2006 | Gandrud |
| 7,124,452 B1 | 10/2006 | Bauza |
| 7,150,293 B2 | 12/2006 | Jonte |
| 7,201,154 B2 | 4/2007 | Veinotte et al. |
| 7,228,874 B2 | 6/2007 | Bolderheij et al. |
| 7,240,850 B2 | 7/2007 | Beck et al. |
| 7,377,290 B2 | 5/2008 | Albert et al. |
| 7,458,520 B2 | 12/2008 | Beltz et al. |
| 7,537,023 B2 | 5/2009 | Marty et al. |
| 7,690,395 B2 | 4/2010 | Jonte et al. |
| 7,701,314 B2 | 4/2010 | Hazzard et al. |
| 7,753,074 B2 | 7/2010 | Rosko et al. |
| 7,798,174 B2 | 9/2010 | Ford et al. |
| 7,997,301 B2 | 8/2011 | Marty et al. |
| 8,162,236 B2 | 4/2012 | Rodenbeck et al. |
| 8,197,610 B2 | 6/2012 | Rosenbauer et al. |
| 8,220,722 B1 | 7/2012 | Shaffer |
| 8,561,626 B2 | 10/2013 | Sawaski et al. |
| 8,572,772 B2 * | 11/2013 | Wolf ........................ E03C 1/057 4/678 |
| 8,613,419 B2 | 12/2013 | Rodenbeck et al. |
| 8,776,817 B2 | 7/2014 | Sawaski et al. |
| 9,458,612 B2 | 10/2016 | Thomas et al. |
| 9,594,500 B2 | 3/2017 | Clements |
| 10,113,739 B2 | 10/2018 | Schneider, II |
| 10,138,622 B2 | 11/2018 | Thomas et al. |
| 10,184,232 B2 * | 1/2019 | Veros .................... E03C 1/0404 |
| 10,612,767 B2 | 4/2020 | Schneider, II |
| 2001/0048244 A1 | 12/2001 | Altenrenger et al. |
| 2002/0166986 A1 | 11/2002 | Remby et al. |
| 2003/0125842 A1 | 7/2003 | Chang et al. |
| 2005/0133100 A1 | 6/2005 | Bolderheij et al. |
| 2007/0246550 A1 | 10/2007 | Rodenbeck et al. |
| 2008/0078019 A1 | 4/2008 | Allen et al. |
| 2008/0115844 A1 | 5/2008 | Teichmann et al. |
| 2008/0203339 A1 | 8/2008 | Kato et al. |
| 2008/0251533 A1 | 10/2008 | Giles et al. |
| 2009/0094740 A1 | 4/2009 | Ji |
| 2010/0108165 A1 | 5/2010 | Rodenbeck et al. |
| 2010/0200789 A1 * | 8/2010 | Connors ................. F16K 31/02 251/129.04 |
| 2011/0185493 A1 | 8/2011 | Chen |
| 2012/0017367 A1 | 1/2012 | Reeder et al. |
| 2012/0055557 A1 | 3/2012 | Belz et al. |
| 2012/0101879 A1 | 4/2012 | Galakatos et al. |
| 2012/0112107 A1 | 5/2012 | Da et al. |
| 2012/0247583 A1 | 10/2012 | Schneider |
| 2014/0261780 A1 | 9/2014 | Thomas et al. |
| 2015/0040997 A1 | 2/2015 | Blake et al. |
| 2015/0308089 A1 * | 10/2015 | Thompson ......... G05D 23/1393 137/78.1 |
| 2016/0362877 A1 | 12/2016 | Thomas et al. |
| 2017/0260722 A1 | 9/2017 | Horwitz et al. |
| 2017/0315569 A1 | 11/2017 | Rodenbeck et al. |
| 2018/0195711 A1 | 7/2018 | Schneider, II |
| 2018/0216325 A1 * | 8/2018 | Chen .................... G05D 7/0635 |
| 2018/0298597 A1 | 10/2018 | Thomas et al. |
| 2019/0056100 A1 | 2/2019 | Schneider, II |
| 2019/0194917 A1 | 6/2019 | Wang |
| 2019/0292757 A1 | 9/2019 | Sawaski |

FOREIGN PATENT DOCUMENTS

| | | |
|---|---|---|
| CN | 202432111 | 9/2012 |
| CN | 202521048 | 11/2012 |
| CN | 103206781 | 7/2013 |
| CN | 104019242 | 9/2014 |
| CN | 104048089 | 9/2014 |
| EP | 0376894 | 7/1990 |
| EP | 0650002 | 4/1995 |
| EP | 0687817 | 12/1995 |
| EP | 0832801 | 4/1998 |
| EP | 1160806 | 12/2001 |
| EP | 1371888 | 12/2003 |
| EP | 1508731 | 2/2005 |
| EP | 1518030 | 3/2005 |
| EP | 1528282 | 5/2005 |
| EP | 1903581 | 3/2006 |
| EP | 1699967 | 9/2006 |
| EP | 2438334 | 4/2012 |
| JP | 01-199075 | 8/1989 |
| JP | 02-607670 | 3/1990 |
| JP | 03-250488 | 11/1991 |
| JP | 04-310548 | 11/1992 |
| JP | 10-026243 | 1/1998 |
| JP | 10-132122 | 5/1998 |
| JP | 2002-043121 | 2/2002 |
| JP | 3437265 | 8/2003 |
| JP | 4665226 | 4/2011 |
| WO | WO 98/21511 | 5/1998 |
| WO | WO 2004/001142 | 12/2003 |
| WO | WO 2005/061776 | 7/2005 |
| WO | WO 2007/082301 | 7/2007 |
| WO | WO 2008/094651 | 8/2008 |
| WO | WO 2009/075858 | 6/2009 |
| WO | WO 2010/140096 | 12/2010 |

* cited by examiner

FAUCET INCLUDING A WIRELESS CONTROL MODULE

CROSS-REFERENCE TO RELATED APPLICATION

The present application is a continuation of U.S. patent application Ser. No. 16/765,650, filed May 20, 2020, which is a 371 U.S. National Phase of PCT International Application No. PCT/US2018/062258, filed Nov. 21, 2018, which claims priority to U.S. Provisional Patent Application Ser. No. 62/589,540, filed Nov. 21, 2017, the disclosures of which are expressly incorporated herein by reference.

BACKGROUND AND SUMMARY OF THE DISCLOSURE

The present disclosure relates generally to a fluid delivery apparatus and, more particularly, to a faucet including a wireless control module facilitating voice controlled operation of an electrically operable valve.

Electronic faucets typically include an electrically operable valve coupled to an electronic controller for controlling fluid flow through a water outlet. Some electronic faucets include proximity sensors, such as active infrared ("IR") proximity detectors or capacitive proximity sensors to control operation of the electrically operable valve. Such proximity sensors may be used to detect a user's hands positioned near the faucet and to automatically start fluid flow through the faucet in response to detection of the user's hands. Other electronic faucets may use touch sensors, such as capacitive touch sensors, to control the faucet. An illustrative electronic faucet is detailed in U.S. Patent Application Publication No. 2016/0362877 to Thomas et al., the disclosure of which is expressly incorporated herein by reference.

Electronic faucets that may be controlled by voice commands are known in the art. Such voice controlled faucets may include a microphone to receive audible input for controlling operation of an electrically operable valve.

The present disclosure relates to a modular accessory that may be added to an existing electronic faucet to allow wireless control of the faucet. The inputs for such wireless control may originate from a variety of devices including, for example, voice recognition and conversion devices, dedicated remote user interfaces, and/or smartphones.

The illustrative wireless control module of the present disclosure adds functionality to an existing electronic faucet, such as hands-free operation and programmatic control of water flow (a handwashing mode for example, where water flow is timed). The wireless control module may also contain sensors to measure water parameters such as water temperature and/or flow rate. Use of these sensors allows for added functionality, such as purging cold water from a hot water line (warm up), dispensing a prescribed amount of water, and/or monitoring water usage.

Because the illustrative wireless control module is a releasably coupled accessory and not integrated into the electronic faucet, it may be added by only those consumers who desire the added functionality without including unnecessary complexities and burdening the base cost of the electronic faucet.

According to an illustrative embodiment of the present disclosure, an electronic faucet includes a spout, a fluid supply conduit supported by the spout, and a valve assembly. The valve assembly includes an electrically operable valve positioned to control fluid flow through the fluid supply conduit. A valve controller is operative to control the electrically operable valve. A wireless control module is in communication with the valve controller. The wireless control module includes a transceiver configured to send and/or receive wireless signals from a remote transmitter and communicate with the valve controller to control operation of the electrically operable valve.

According to another illustrative embodiment of the present disclosure, a wireless control module for an electronic faucet includes a body defining a fluid passageway extending between an inlet and an outlet, a receiver configured to receive wireless signals from a remote transmitter, and a wireless controller operably coupled to the receiver. A cable is coupled to the receiver, and is in communication with a valve controller to control operation of an electrically operable valve. A releasable coupler is configured to couple the inlet of the fluid passageway to an outlet of the electrically operable valve.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

A detailed description of the drawings particularly refers to the accompanying figures, in which.

DETAILED DESCRIPTION OF THE DRAWINGS

Figure 1:
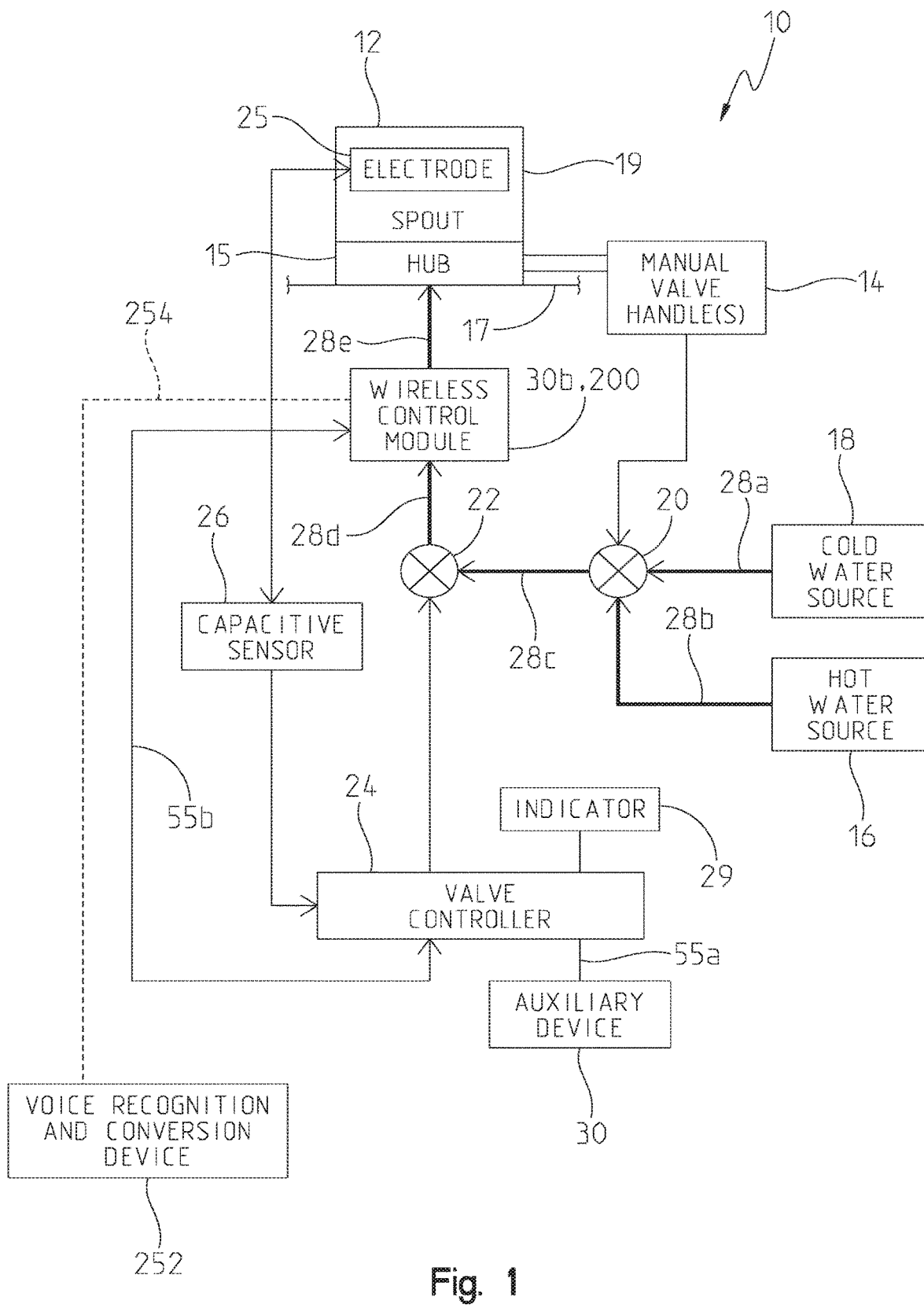
FIG. 1 is a block diagram illustrating an exemplary electronic faucet of the present disclosure.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

Referring initially to FIG. 1, a block diagram of an electronic faucet 10 is shown according to some illustrative embodiments of the present disclosure. Electronic faucet 10 includes a spout 12 supporting a passageway or waterway (e.g., a fluid conduit) for delivering fluids such as water, for example. In the illustrated embodiment, the passageway of spout 12 includes fluid passages between hot and cold water sources 16, 18 and a water outlet 19 of spout 12. See, for example, passages 28a, 28b, 28c, 28d, 28e of FIG. 1. Electronic faucet 10 illustratively includes an electrically operable valve, such as a solenoid valve 22, in fluid communication with hot and cold water sources 16, 18. Solenoid valve 22 is illustratively controlled electronically by a valve controller 24. It should be noted that the controller 24 may be integral with, or separate from, the solenoid valve 22.

In the illustrated embodiment, valve controller 24 is configured to open and close solenoid valve 22 to turn on and off the fluid flow to outlet 19 of spout 12. In another illustrative embodiment, valve controller 24 is further configured to proportionally control valve 22 to adjust the flow rate and/or temperature of the fluid flowing through spout 12 to outlet 19. In an illustrative embodiment described herein, solenoid valve 22 includes a pilot operated solenoid valve, although another suitable electrically operable or actuator driven valve may be provided, such as an electronically proportional valve (EPV).

In the illustrated embodiment, valve controller 24 controls solenoid valve 22 based on output from at least one activation sensor, such as a proximity sensor and/or a touch sensor, for example, to turn on and off fluid flow through spout 12. In an illustrative embodiment, the activation sensor comprises a capacitive sensor 26 in communication with valve controller 24 for providing signals to valve controller 24 indicating the detection of an object (e.g. a user's hands) on or near spout 12. Other suitable activation sensors may be provided for detecting an object near faucet 10. As illustrated, an electrode 25 of capacitive sensor 26 is coupled to spout 12 (or is part of spout 12) to detect the object contacting spout 12. Electrode 25 may be positioned in other suitable areas of faucet 10 for detecting the presence of a user's hands.

In the illustrative embodiment, capacitive sensor 26 and electrode 25 are used for at least one of a touch mode and a hands-free mode of operation. In the hands free mode of operation, capacitive sensor 26 and valve controller 24 detect a user's hands or other object within a detection area or zone near spout 12. In one embodiment, the detection area includes the water stream and the area in the sink basin immediately surrounding the water stream. The detection area may be expanded to other areas depending on the location and sensitivity of capacitive sensor 26. In the touch mode of operation, capacitive sensor 26 and valve controller 24 detect a user's hands or other object upon contact with a surface of spout 12. To turn on the electronic faucet 10 in either mode, solenoid valve 22 is activated by valve controller 24 upon detecting the object (e.g., user's hands) to toggle water flow on and off.

In some illustrative embodiments, by sensing capacitance changes with capacitive sensor 26, valve controller 24 is configured to make logical decisions to control different modes of operation of faucet 10 such as changing between a manual mode of operation and a hands free mode of operation as described in U.S. Pat. Nos. 7,537,023; 7,690,395; 7,150,293; 7,997,301; and PCT International Patent Application Publication Nos. WO 2008/094651 and WO 2009/075858, the disclosures of which are all expressly incorporated herein by reference.

In one illustrative embodiment, manual adjustment of the water temperature and flow rate may be provided after opening the solenoid valve 22 by manipulating a manual valve handle 14. The handle 14 may be supported by a hub 15 supporting the spout 12. More particularly, hub 15 is illustratively positioned intermediate the spout 12 and a mounting deck 17 (e.g., a sink deck). In particular, manual valve handle 14 may be used to manipulate a manual valve assembly 20 positioned in the passageway of spout 12 to adjust the temperature and/or flow of fluid from the hot and cold water sources 16, 18 to solenoid valve 22. A separate manual valve handle 14 and associated manual valve assembly 20 may be provided for each of the hot and cold water sources 16 and 18. Alternatively, electronic faucet 10 is a fully automatic faucet without any manual controls (i.e., no manual valve assembly 20). An illustrative manual valve assembly 20 is detailed in U.S. Pat. No. 7,753,074, the disclosure of which is expressly incorporated herein by reference.

In an illustrative embodiment, valve controller 24 may further control valve assembly 20 electronically. In particular, valve assembly 20 may include an electronic proportioning or mixing valve that is adjusted by valve controller 24 to control the mixture of hot and cold water and thus the temperature of the water flowing through spout 12 to outlet 19. Such an electronic mixing valve 20 may be in addition to, or replace, the solenoid valve 22. Additionally, the mixing valve 20 may be replaced by separate hot and cold water proportional valves.

Exemplary electronically controlled mixing valves are described in U.S. Pat. No. 7,458,520 and PCT International Patent Application Publication No. WO 2007/082301, the disclosures of which are expressly incorporated by reference herein. The amount of fluid flowing from hot water source 16 and cold water source 18 may be controlled by valve controller 24 based on one or more user inputs, such as desired fluid temperature, desired fluid flow rate, desired fluid volume, various task based inputs, various recognized presentments, and/or combinations thereof. For example, faucet 10 may include a temperature sensor (e.g., temperature sensor 54 described herein) in fluid communication with the output of the proportioning valve to provide feedback to valve controller 24 for use in controlling the water temperature. In one embodiment, valve controller 24 controls the proportional valve via the auxiliary port 56 (FIG. 2) described herein.

In one illustrative embodiment, faucet 10 includes one or more indicators 29 controlled by valve controller 24 to provide a visual or audio indication of the operational mode (e.g., hands free and/or touch mode) and/or water temperature of the electronic faucet 10. An exemplary indicator 29 includes a light-emitting diode (LED) or other light source or audible device positioned near faucet 10. Other exemplary indicators 29 include a liquid crystal display (LCD) and a magnetically latching mechanical indicator. In one embodiment, indicators 29 are operative to indicate operating mode and/or the temperature of the water flowing through faucet 10 based on the selective illumination of different colored LED's or a single multi-colored LED.

In the illustrated embodiment, valve controller 24 may be in communication with a remote device in addition to electronic faucet 10, illustratively an auxiliary device 30. The exemplary auxiliary device 30 may include, for example, another faucet spout 30a (FIG. 2), a soap dispenser, a beverage dispenser, or another suitable dispensing device. The auxiliary device 30 may also comprise any of a garbage disposal, a dishwasher, an instant hot device, a remote switch (e.g., a foot switch), or other device associated with or in proximity to a plumbing device. As further detailed herein, the auxiliary device 30b (FIG. 2) may comprise a wireless communication device (e.g., a wireless control module). Auxiliary device 30 may be positioned adjacent the same sink basin as spout 12. Alternatively, auxiliary device 30 may be positioned to dispense into a different sink basin, such as another sink basin in a bathroom or kitchen or in another room, for example.

Figure 2:
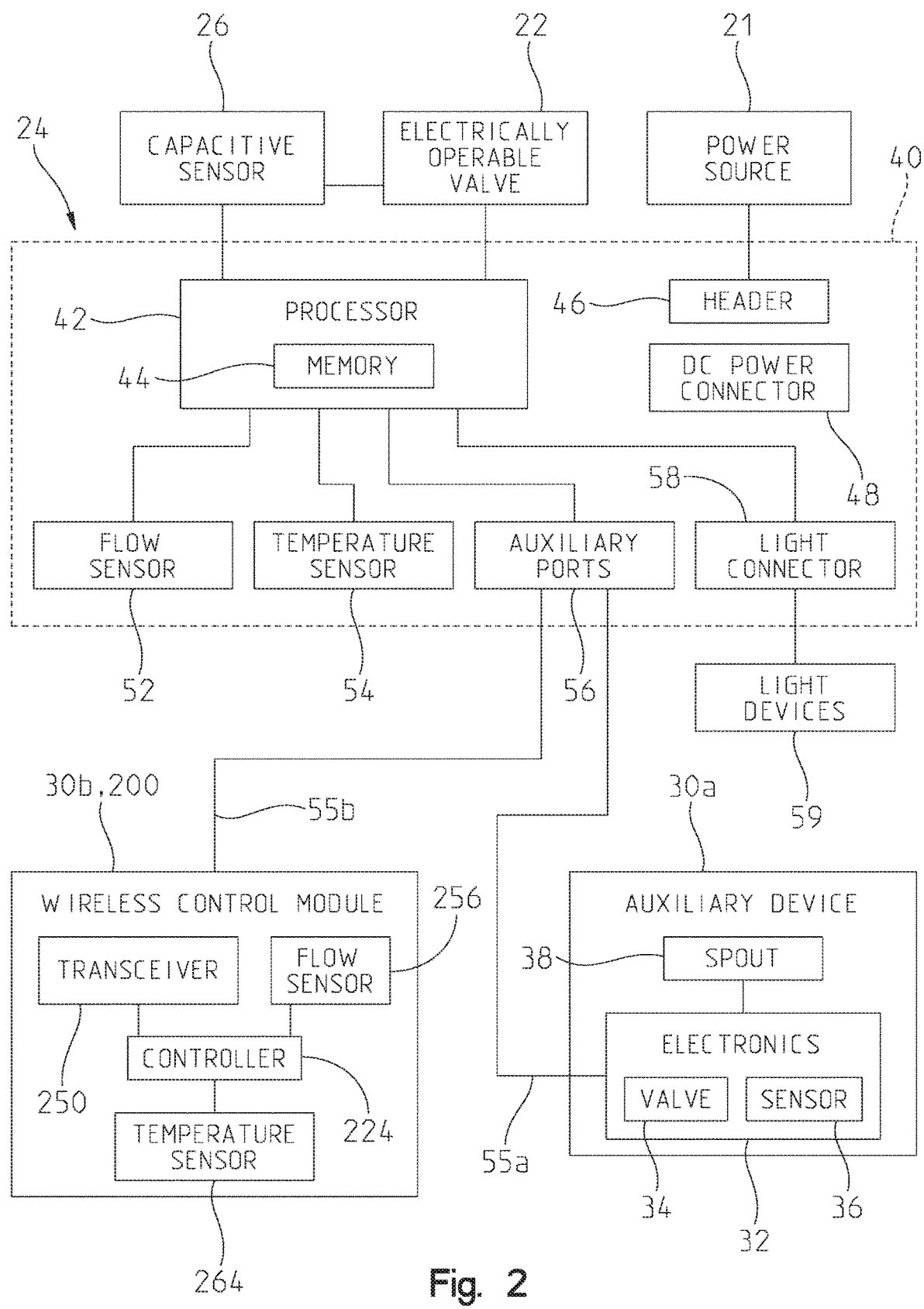
FIG. 2 is a block diagram illustrating an exemplary controller and wireless control module of the electronic faucet of FIG. 1.
Figure 3:
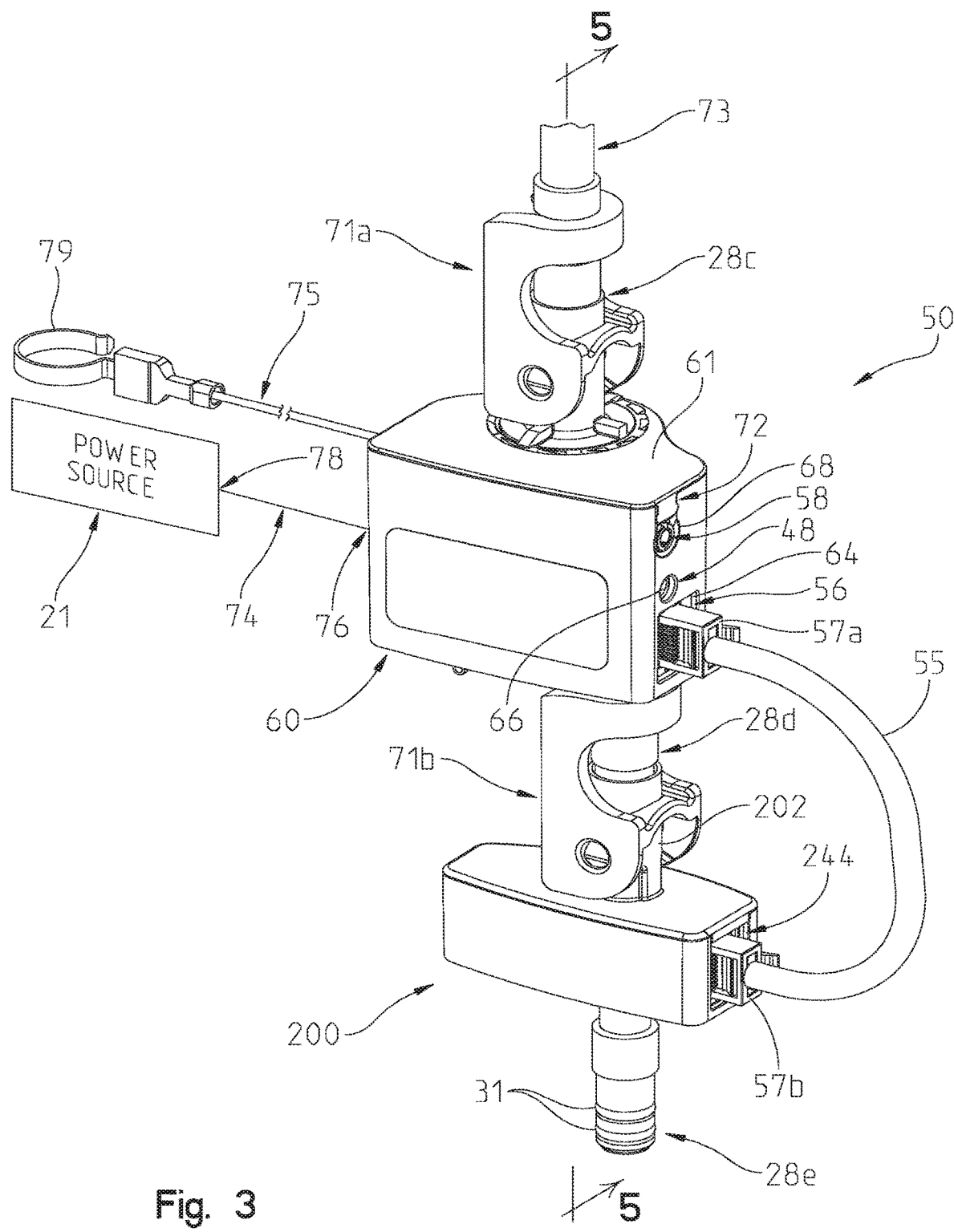
FIG. 3 is a perspective view of a valve assembly and a wireless control module of the illustrative electronic faucet of FIG. 1.

As described in detail herein, valve controller 24 illustratively includes an auxiliary port 56 (see FIGS. 2 and 3) for remotely controlling and/or powering the auxiliary device 30 via an electronic cable 55 (FIG. 3). The electronic cable 55 may be of conventional design and, illustratively, comprises a serial cable including opposing first and second end connectors 57a and 57b, and providing for bidirectional communication, as further detailed herein. More than one auxiliary device 30a, 30b, etc. may be coupled to different auxiliary ports 56 by multiple electronic cables 55a, 55b. While the illustrative auxiliary device 30 may be fully controlled by valve controller 24, the device 30 may also include a separate controller (e.g., microprocessor) for operating itself, while receiving power and/or communication signals from the controller 24.

Referring further to FIG. 2, a block diagram of exemplary valve controller 24 of FIG. 1 is illustrated. Valve controller 24 illustratively includes a printed circuit board 40 and multiple circuit components mounted to the printed circuit board 40. Illustratively, a processor 42, a flow sensor 52, a temperature sensor 54, auxiliary port(s) 56, and a light connector 58 are coupled to circuit board 40. A connection header 46 is illustratively coupled to circuit board 40 for coupling a power line from an external power source 21. In one illustrative embodiment, power source 21 is a battery power supply or other direct current (DC) power supply connected at header 46. Internal or external memory 44 of processor 42 may include software and/or firmware containing instructions executed by processor 42 for controlling solenoid valve 22, other components of faucet 10, and other devices (e.g., auxiliary devices 30). Processor 42 illustratively controls solenoid valve 22 based on output from capacitive sensor 26, flow sensor 52, and/or temperature sensor 54.

Light connector 58 is configured to route electrical current to light devices 59, such as LED's for example, to illuminate light devices 59. In one illustrative embodiment, light devices 59 are different colors, and processor 42 selectively controls light devices 59 to illuminate different colors based on the operating mode of the faucet 10 and/or the temperature of the water flowing through faucet 10. An exemplary light connector 58 includes an audio jack connector. In one embodiment, indicators 29 of FIG. 1 include the light devices 59 of FIG. 2. In the exemplary embodiment, valve controller 24 also includes a power connector 48 for coupling valve controller 24 to a wall outlet or other building power supply to power valve controller 24. Power connector 48 illustratively includes a rectifier to convert alternating current (AC) power to DC power levels suitable for valve controller 24.

Figure 4:
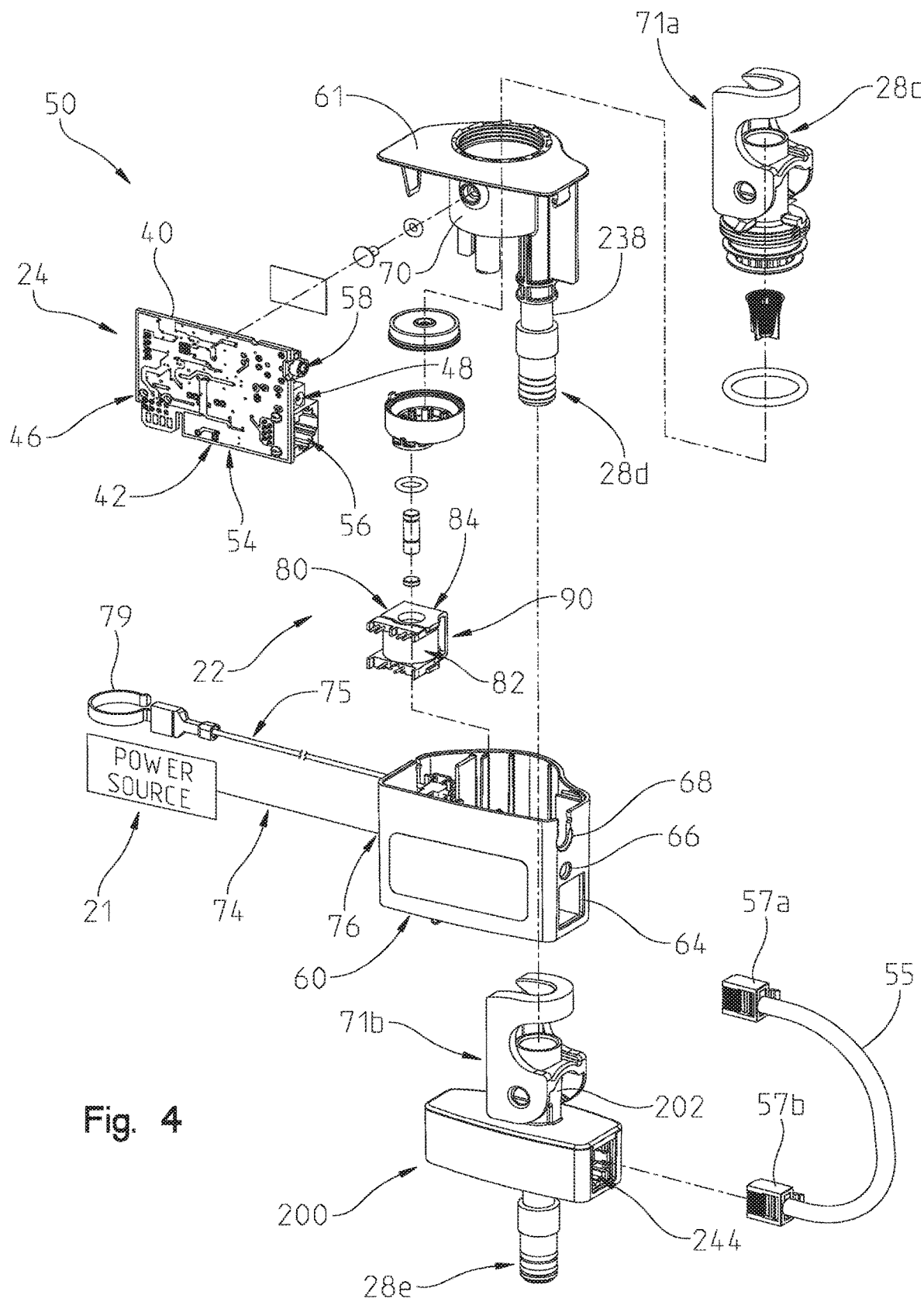
FIG. 4 is a perspective view of the valve assembly and the wireless control module of FIG. 3, with the valve assembly shown partially exploded.
Figure 5:
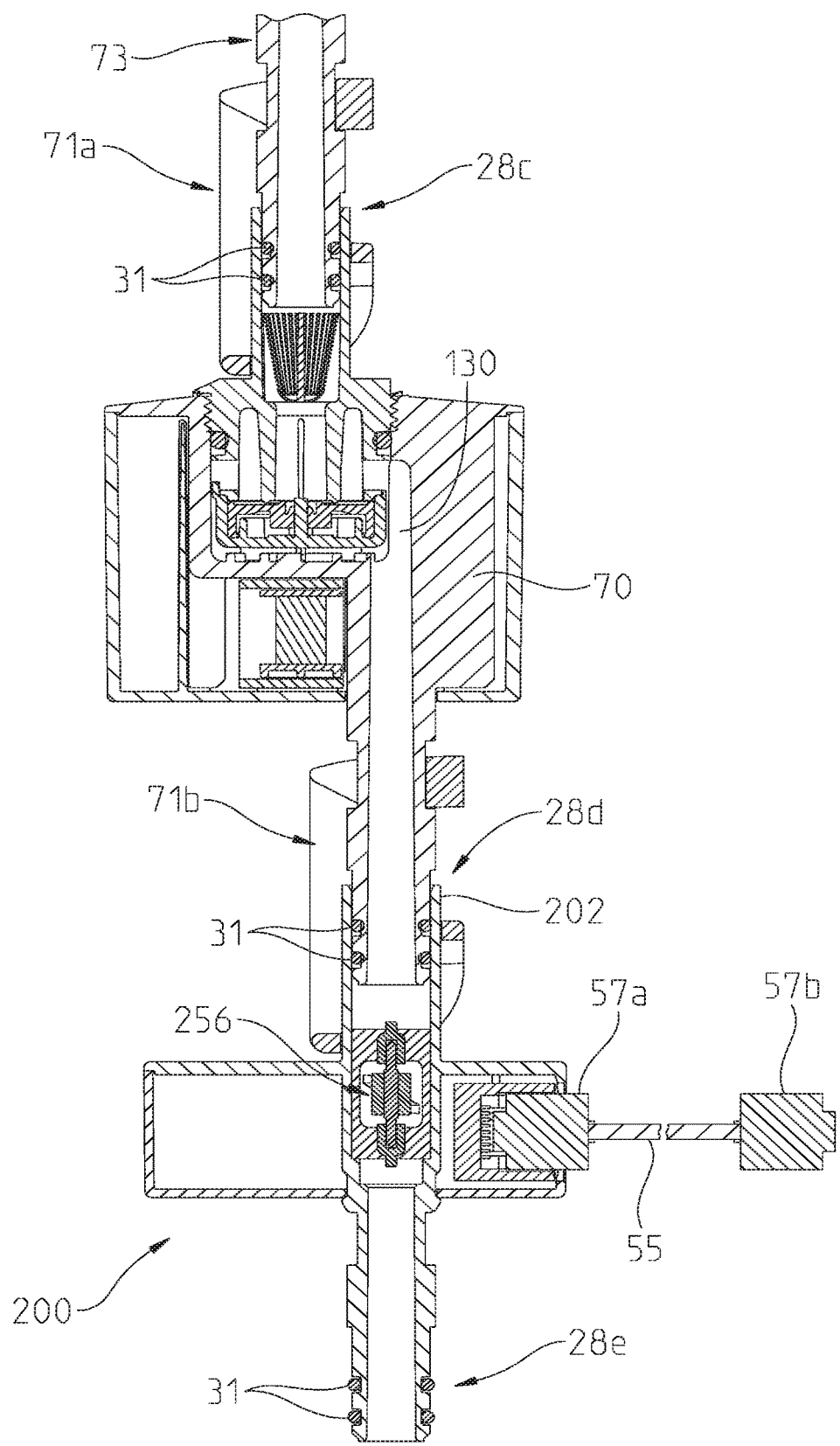
FIG. 5 is a cross-sectional view taken along line 5-5 of FIG. 3.

Referring to FIGS. 3-5, an exemplary solenoid valve assembly 50, including solenoid valve 22, is illustrated in fluid and electrical communication with a wireless control module 200. Fluid enters a valve housing 70 (FIG. 4) of solenoid valve assembly 50 via fluid conduit 28c and exits valve housing 70 via fluid conduit 28d, then through wireless control module 200 and to spout 12 via fluid conduit 28e (FIG. 1). Fluid conduits 28d and 28e may include seals 31 (FIG. 3) providing a sealing connection to a mating component of the fluid conduit 28e and the fluid conduit of spout 12, respectively. Swing connectors or couplers 71a and 71b are illustratively pivotally supported for coupling together fluid conduit 28c with an inlet tube 73 from the manual valve assembly 20, and for coupling together fluid conduit 28d with a main body 202 of wireless control module 200.

Solenoid valve assembly 50 illustratively includes an outer housing 60 for enclosing and protecting valve controller 24 and solenoid valve 22 positioned within housing 60. Outer housing 60 is configured to slide over the top of valve housing 70 (FIG. 4) and mount to a base 61 of assembly 50. Clips 72 on opposite ends of base 61 are configured to engage outer housing 60, although other suitable fasteners may be used to couple outer housing 60 to base 61. Outer housing 60 includes an opening 62 for receiving fluid conduit 28d. Outer housing 60 further includes an opening 64 that provides access to auxiliary port 56, an opening 66 that provides access to DC power connector 48, and an opening 68 that provides access to light connector 58.

As illustrated in FIG. 4, valve controller 24 is mounted to valve housing 70 of assembly 50. A power cable 74 routes power from power source 21 to valve controller 24 for powering the electronic components of valve controller 24. Power cable 74 includes electrical wires routed between a connector end 76 configured to couple to header 46 (FIG. 5) of valve controller 24 and an opposite connector end 78 configured to couple to power source 21. Additional cable wires 75 may be provided to route sensor signals, such as from capacitive sensor 26, to valve controller 24. In an illustrative capacitive sensing embodiment, a contact clip 79 may be electrically coupled to a mounting shank of spout 12.

As illustrated in FIG. 4, a solenoid coil 80 of solenoid valve 22 includes coil wire 82 wound around a bobbin 84. In the illustrated embodiment, solenoid coil 80 is mounted directly to circuit board 40. A U-shaped metal bracket 90 is sized to fit over solenoid coil 80. Metal bracket 90 serves as a component for routing magnetic flux generated with solenoid coil 80. In particular, when solenoid coil 80 is energized by controller 24, bracket 90 provides a flow path for the generated magnetic flux. Additional details on the solenoid valve 22 are provided in U.S. Patent Application Publication No. 2016/0362877 to Thomas et al., the disclosure of which is expressly incorporated herein by reference.

Referring further to the FIG. 4, processor 42, header 46, temperature sensor 54, port 56, DC connector 48, and light connector 58 are illustratively mounted to printed circuit board 40. Port 56, DC connector 48, and light connector 58 are illustratively mounted at an edge of circuit board 40 to align with openings 64, 66, 68 of outer housing 60. Circuit board 40 includes other suitable electronics for controlling solenoid valve 22. Header 46 illustratively includes electrical pins configured to receive connector end 76 of power cable 74.

Auxiliary port 56 is configured to receive a connector cable 55 routed to auxiliary device 30 (FIG. 2) that may be in communication with and powered by valve controller 24. Illustratively, the auxiliary device 30a may comprise the wireless control module 200. Connector cable 55 includes first end connector 57a that is releasably coupled to auxiliary port(s) 56. As such, a plug-and-play configuration is provided with auxiliary port(s) 56 that facilitates quick coupling and decoupling of secondary devices (e.g., auxiliary device 30) that are controllable with valve controller 24 of faucet 10. In one illustrative embodiment, more than one auxiliary device 30 is coupled to auxiliary port 56 and controlled by valve controller 24.

Referring again to FIG. 2, the control and power management software/firmware and control switches of valve controller 24 are illustratively used to control the operation of auxiliary device(s) 30. Auxiliary device 30 may include, for example, a soap dispenser, another faucet, a beverage dispenser, a filtered water dispenser, a hot water dispenser, or another suitable dispensing device. As illustrated in FIG. 2, auxiliary dispensing device 30a may include a spout 38 that supports a fluid supply conduit. Dispensing device 30a illustratively includes electronics 32 in communication with valve controller 24 including an electrically operable valve 34, such as a solenoid valve or electronically proportional valve (EPV), positioned in the fluid supply conduit for controlling fluid flow through spout 38. Electronics 32 are releasably coupled to auxiliary port 56 via the quick-coupling connector cable 55a routed between the faucet 10 and device 30a. In one embodiment, fluid flow through the auxiliary device 30a is controlled by processor 42 based on serial communication received from auxiliary device 30 (e.g., from a sensor 36) via port 56, similar to the capacitive-based controls of faucet 10. As further detailed herein, the auxiliary device 30a may also include a separate controller (not shown) in communication with valve 34 and/or sensor 36 to control operation thereof.

Valve controller 24 illustratively routes power received from power source 21 (FIG. 2) or DC connector 48 to electronics 32 of auxiliary device 30 via port 56 to power device 30. As such, in one illustrative embodiment, both faucet 10 and the auxiliary device 30 operate off the same power source as managed by valve controller 24. Valve controller 24 is operative to receive inputs from auxiliary device 30, process the inputs, and output electrical signals for controlling the electronics 32 (e.g., solenoid, motor, lights, etc.) of device 30 based on the received inputs. In one embodiment, auxiliary device 30 includes at least one proximity sensor 36, such as a capacitive sensor or infrared sensor, operative to detect a user's hands on or near device 30, as similarly described herein with respect to capacitive sensor 26 of electronic faucet 10. Alternatively, auxiliary device 30 may include a switch device configured to instruct valve controller 24 to activate the device 30 upon actuation of the switch device by the user. Valve controller 24 may control fluid flow (e.g., water, soap, beverage, etc.) through auxiliary device 30 based on the received signals from the proximity sensor 36 or the switch device. Valve controller 24 is also operative to power display lights, such as LED's, on auxiliary device 30 corresponding to the various operational modes or states of device 30.

Accordingly, auxiliary device 30 may include a passive or dumb electrical interface with limited or no active controls wherein the electronics 32 of the interface are controlled remotely by valve controller 24 of faucet 10 via auxiliary port 56. In one illustrative embodiment, the circuitry of auxiliary device 30 includes the necessary circuitry for connecting the device 30 to valve controller 24, for detecting and sending an activation request to valve controller 24, and for actuating the fluid valve based on controls from valve controller 24. In other illustrative embodiments, the auxiliary device 30 may include a controller (e.g., a microprocessor) for operating itself, wherein the auxiliary device 30 only receives power and/or communication from the controller 24.

In one illustrative example, auxiliary port 56 includes a multi-pin (e.g., 8 pin) registered jack (RJ) receptacle, although any suitable electrical connector may be used for port 56. In one illustrative embodiment, the multiple pin connections of auxiliary port 56 include a switched power supply connected to battery voltage (e.g., power source 21) for powering electronics of auxiliary device 30, a ground line, a serial data transmit line, a serial data receive line, an interrupt line, a 3.3 volt power line, and a reset line.

Temperature sensor 54 may be mounted (e.g., soldered) directly to circuit board 40. As such, sensor 54 is illustratively positioned outside of valve housing 70. In one illustrative embodiment, temperature sensor 54 includes a surface-mount type NTC thermistor soldered to circuit board 40, although other suitable temperature sensors may be used. A heat transfer device extends from temperature sensor 54 to inside an interior region or waterway 130 (FIG. 5) of valve housing 70. Heat transfer device is operative to transfer heat from the fluid within interior region 130 of valve housing 70 to temperature sensor 54, as described herein.

Illustratively, processor 42 is operative to control faucet 10 based on the water temperature measured with temperature sensor 54. In one illustrative embodiment, processor 42 is operative to selectively control light devices 59 (FIG. 2) to illuminate different colored devices 59 to indicate the water temperature to the user. For example, blue indicates cold water, red indicates hot water, and shades between red and blue indicate temperatures between hot and cold. Alternatively, processor 42 illustratively displays the water temperature numerically on a digital or analog display (e.g., an LCD display of indicator 29). In one illustrative embodiment, valve controller 24 is programmed to shut off water flow, i.e., close solenoid valve 22, automatically upon the detected water temperature exceeding a threshold temperature. An exemplary threshold temperature is about 120 degrees Fahrenheit, although other suitable thresholds may be set. In one embodiment, controller 42 uses the temperature information from sensor 54 to control an electrically operable mixing valve (e.g., valve 20) in series with solenoid valve 22. The mixing valve is controlled to mix water proportionally from hot and cold sources 16 and 18 to achieve a desired temperature. The desired temperature may be selectable by the user or may be predetermined and programmed in memory of processor 42. As such, closed loop temperature control of the water through faucet 10 may be provided with temperature sensor 54. Other suitable controls may be implemented based on water temperature.

Figure 6:
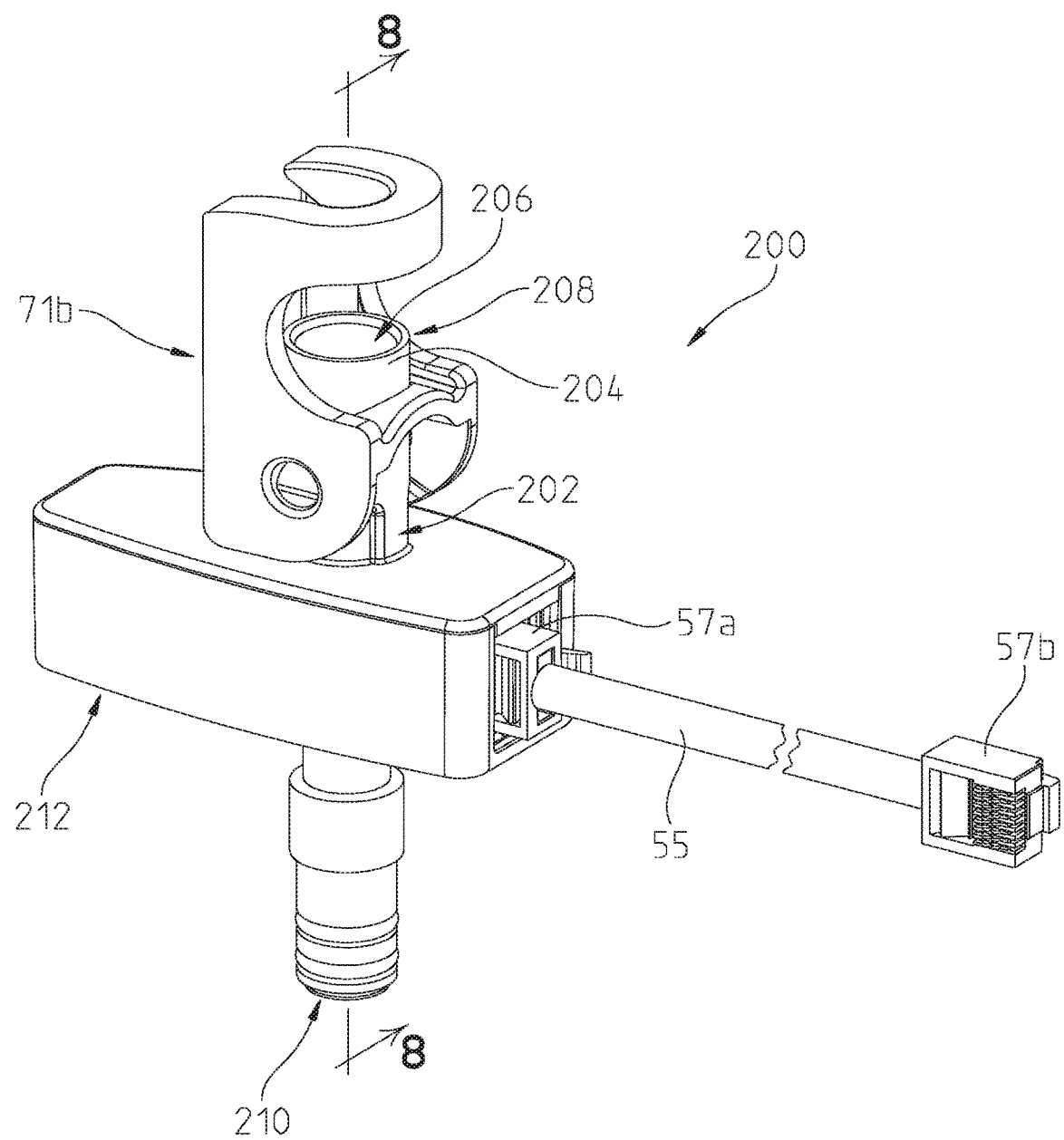
FIG. 6 is a perspective view of the illustrative wireless control module of FIG. 3.
Figure 7:
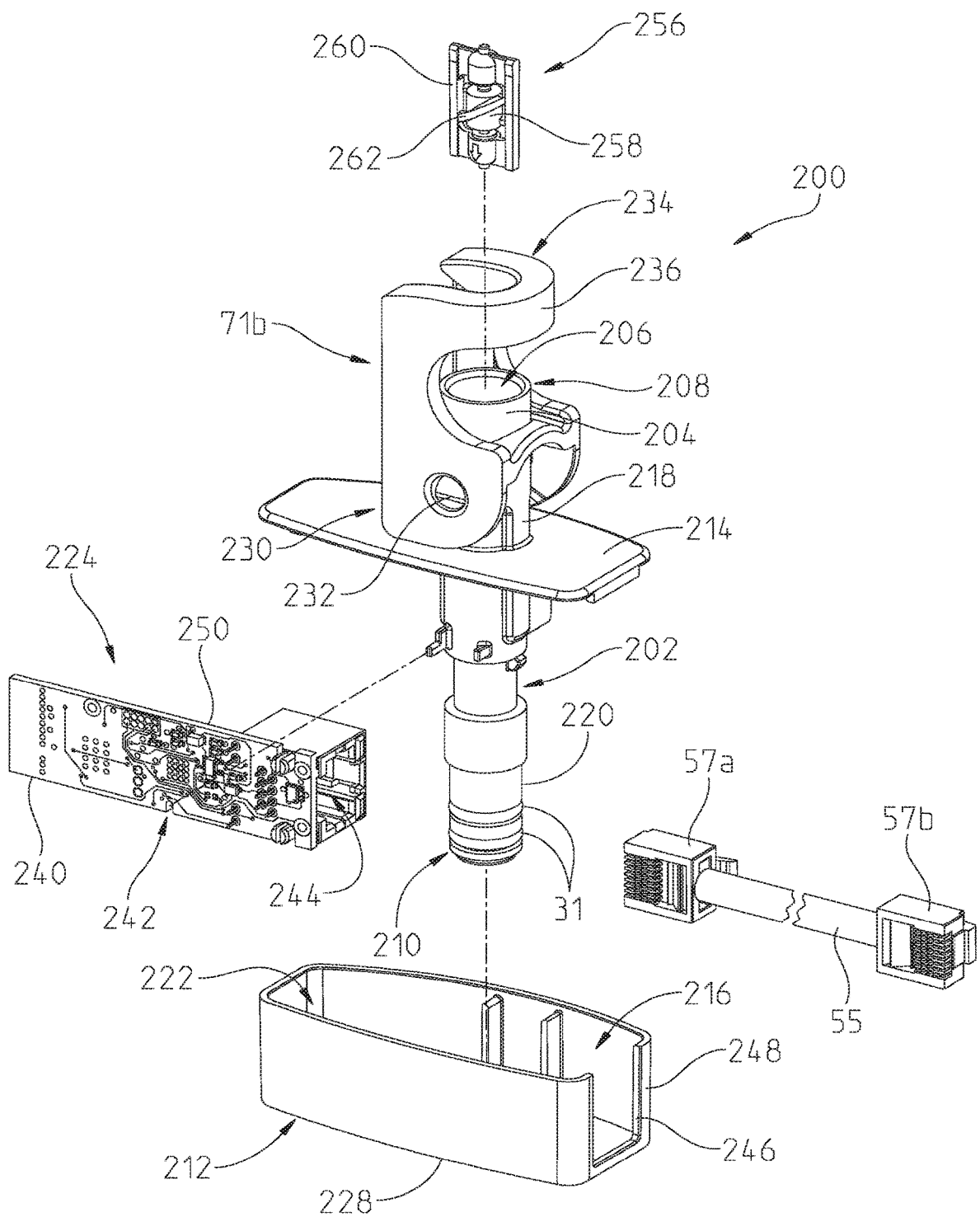
FIG. 7 is an exploded perspective view of the illustrative wireless control module of FIG. 6.
Figure 7A:
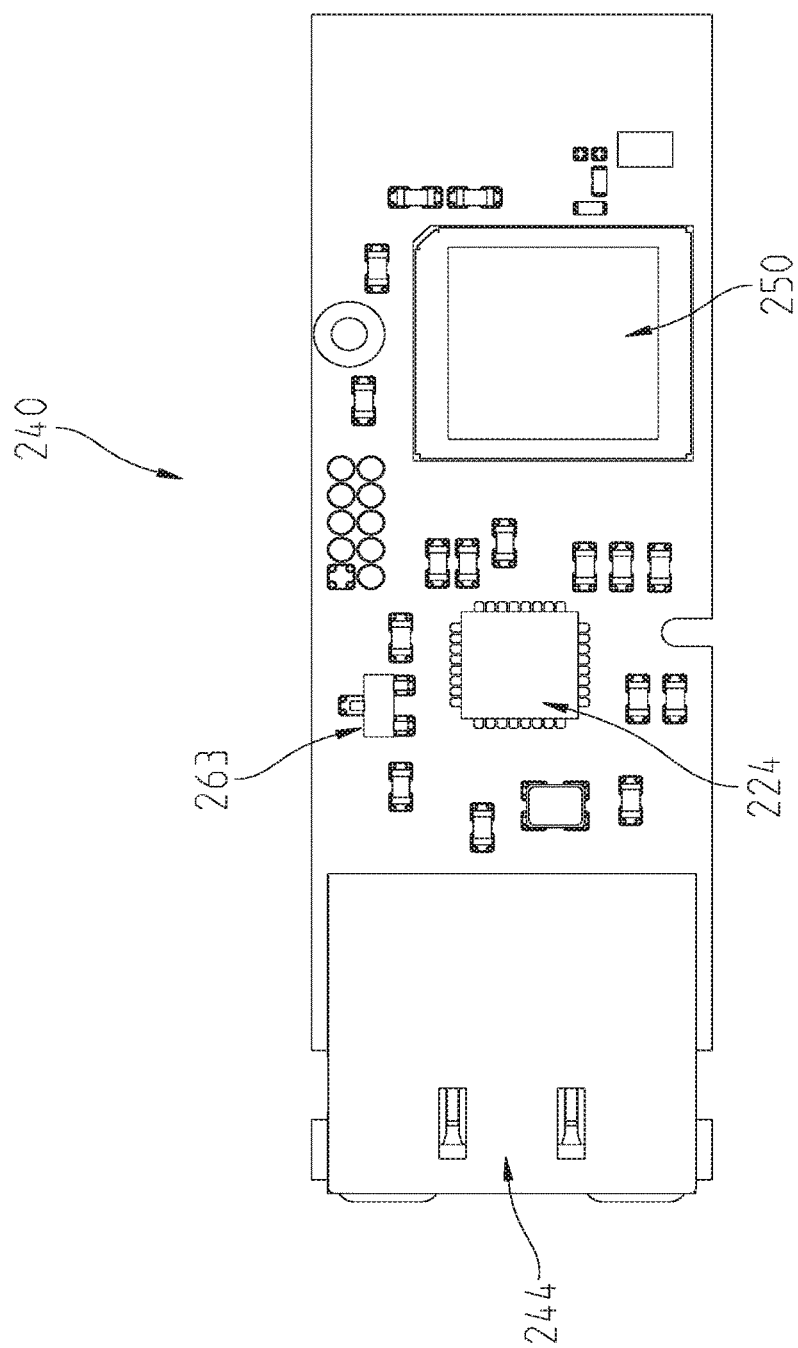
FIG. 7A is a plan view of the printed circuit board of FIG. 7.
Figure 8:
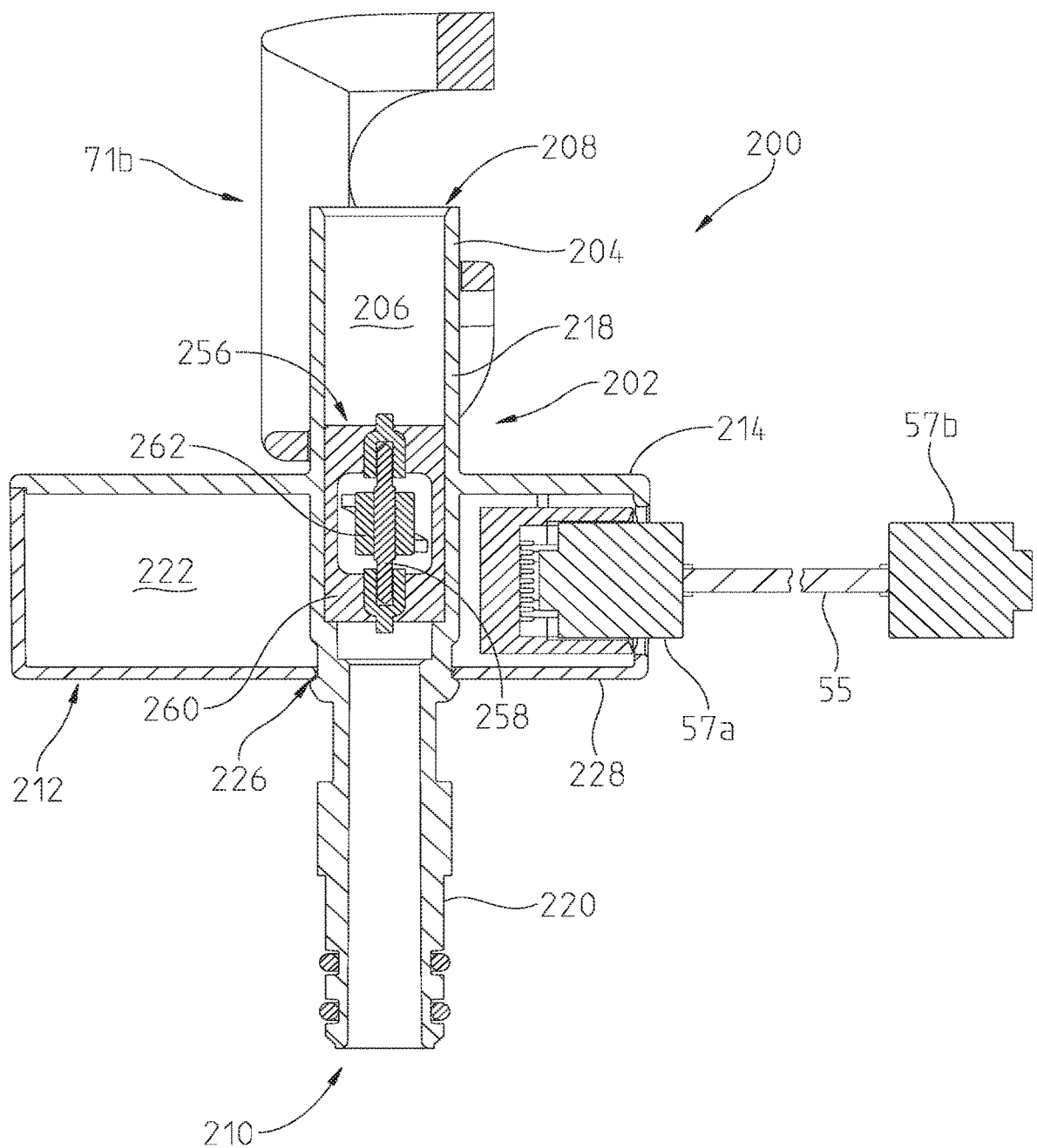
FIG. 8 is a cross-sectional view taken along line 8-8 of FIG. 6.

With reference to FIGS. 6-8, the illustrative wireless control module 200 includes a main body or waterway tube 202 including a tube 204 defining a waterway or fluid passageway 206 extending between an inlet 208 and an outlet 210. The main body 202 may be formed from a polymer, such as a glass fiber reinforced thermoplastic material. A housing or cover 212 is coupled to the main body 202. More particularly, an end wall 214 of the main body 202 is coupled to an open end 216 of the housing 212. The housing 212 may be formed from a polymer, such as an acetal copolymer. An inlet portion 218 of the tube 204 extends in a first direction from the end wall 214, and an outlet portion 220 of the tube 204 extends in a second direction, opposite the first direction, from the end wall 214. A chamber 222 is defined within the housing 212 and receives a wireless controller 224. The outlet portion 220 of the tube 204 extends through the chamber 222 and out of the housing 212 via an opening 226 in an end wall 228.

The inlet 208 is fluidly coupled to the outlet 28*d* of the solenoid valve assembly 22, and the outlet 210 is fluidly coupled to water outlet 19 of spout 12. More particularly, the inlet portion 218 of the tube 204 receives the outlet tube 28*d* of the solenoid valve assembly 22. The swing clip 71*b* illustratively secures the outlet tube 28*d* of the solenoid valve assembly 22 to the tube 204 of the wireless control module 200. More particularly, a first end 230 of the swing clip 71*b* is pivotably coupled to pins 232 on the inlet portion 218 of the tube 204. A second end 234 of the swing clip 71*b* includes an arcuate retainer 236 configured to engage an annular recess 238 on the outlet tube 28*d*. The outlet portion 220 of the tube 204 is illustratively received within an end of fluid conduit 28*e* coupled to the spout tube 12. O-rings 31 may be positioned intermediate the tube 204 and the fluid conduit 28*e* to provide fluid sealing therebetween.

The wireless controller 224 illustratively includes a printed circuit board 240 received within the chamber 222 of the housing 212. The printed circuit board 240 illustratively supports a conventional microprocessor 242. An auxiliary port 244 may also be supported by the printed circuit board 240 and is in electrical communication with the wireless controller 224. The auxiliary port 244 is accessible through an opening 246 in a side wall 248 of the housing 212.

A wireless communication device, such as a wireless transceiver 250, is illustratively supported by the printed circuit board 240 and is in electrical communication with the wireless controller 224. The wireless transceiver 250 is configured to wirelessly communicate (e.g., receive and/or transmit wireless signals, either directly or indirectly) with a remote device 252. Such wireless communications may be via known technologies, such as wireless communications in the 2.4 GHz frequency band including, for example Wi-Fi, ZigBee, and Bluetooth. The wireless transceiver 250 illustratively comprises a wireless radio and antenna, such as a Wi-Fi module or chip, a ZigBee module, or a Bluetooth module. In one illustrative embodiment, the wireless transceiver 250 comprises a Wi-Fi chip configured to be in communication with a Wi-Fi network 254. As detailed herein, the wireless communication device illustratively comprises transceiver 250 for both receiving and transmitting wireless signals. In other words, transceiver 250 is understood to include both a receiver and a transmitter. As such, a receiver may be defined by a transceiver and, more particularly, by transceiver 250 embedded with the printed circuit board 240. Use of the term receiver is not limited to a device that only receives signals, and may include a device that also transmits signals (e.g., a transceiver).

The remote device 252 may comprise a voice recognition and conversion device in wireless communication with the transceiver 250. Alternatively, the remote device 252 may comprise a smart phone, a tablet, a computer and/or a dedicated remote user interface (i.e., remote control). As further detailed herein, the remote device 252 may communicate over the Internet through the cloud to the wireless control module 200. In yet other illustrative embodiments, the remote device 252 may include both a voice recognition and conversion device, and at least one of a smart phone, a tablet, a computer and/or remote control.

A flow sensor 256 is illustratively supported by the tube 204 of the main body 202 to detect water flow within the fluid passageway 206, and is in electrical communication with the wireless controller 224 and/or the valve controller 24. More particularly, the flow sensor 256 illustratively comprises a flow turbine assembly 257 including a flow turbine 258 supported for rotation by a flow turbine cage 260. The flow turbine cage 260 may be received within the tube 204 such that water flow through the fluid passageway 206 rotates the flow turbine 258. The flow turbine 256 may be a magnetic flow turbine including a magnet supported by rotor 262 and a sensor or detector 263 supported on the printed circuit board 240, the detector 263 being configured to detect rotation of the rotor 262. The number of rotations detected by the sensor is correlated to flow rate and/or flow volume by the wireless controller 224 and/or the valve controller 24. The valve controller 24 may control the electrically operable valve 22 to dispense a predetermined amount of water based upon the input from the flow sensor 256. Additionally, the flow sensor 256 may be used to monitor water use and provide such information to the user. More particularly, water usage information from the flow sensor 256 may be provided to the controller 224, and transmitted from the embedded transceiver 250 to the processor 42 for displaying to the user information on water consumption of the faucet 10 over time, for example on a display screen (not shown).

In certain illustrative embodiments, a temperature sensor 264 may be supported by the tube 204 of the main body 202 to detect the temperature of water flowing through the fluid passageway 206, and is in electrical communication with the wireless controller 224 and/or the valve controller 24. Temperature sensor 264 may supplement or replace temperature sensor 54 of the valve assembly 20. As further detailed herein, the temperature sensor 54 may be used with the wireless controller 224 and/or the valve controller 24 to provide a temperature indication to the user, provide a high temperature limit and/or provide a warm-up feature.

Wireless controller 224 illustratively provides a means for reading flow sensor 256, temperature sensor 264 and wireless communication device 250, such as Wi-Fi chip, ZigBee module, or Bluetooth module for receiving and/or transmitting data. Electronic cable 55 communicates commands (e.g., signals) between the wireless control module 200 and the electronic control valve 20 via the valve controller 24. Illustratively, the electronic cable 55 is a serial cable including opposing first and second end connectors 57*a* and 57*b*. The first connector 57*a* is coupled to the port 56 of the valve controller 24, while the second connector 57*b* is coupled to the port 244 of the wireless control module 200.

The modular waterway design detailed herein permits the wireless control module 200 to be inserted between the outlet of the electronic control valve 20 and the waterway extending through faucet spout 12.

A serial communication protocol illustratively exists between the wireless controller 224 of the wireless control module 200 and the processor 42 of the valve controller 24. Serial communication between the wireless controller 224 and the processor 42 is configured to occur bi-directionally. In addition to transmit and receive data signals, an interrupt signal may be used to indicate to the recipient that a data transmission is about to begin. The interrupt signal allows both the wireless control module 200 and the processor 42 of the valve controller 24 to go into low-power sleep modes until one is woken-up, or activated, by the other using the interrupt signal. This scheme or protocol allows for both devices 200, 42 to operate for long periods of time on battery power; as they are not always fully powered-up waiting or searching for data. The serial protocol to send data may be uniquely defined and register based. For example, to set the water state an auxiliary device or smart spout can write the value of '1' to register 0x02 to turn on (e.g., open) the valve 22. As another example, an auxiliary device 30 can request the current water temperature by requesting the value currently stored in register 0x05 in the valve controller 24. Illustratively, all serial message packets use a start byte, a stop byte, a message length byte and two byte cyclic redundancy check (CRC) to ensure data integrity.

Figure 9:
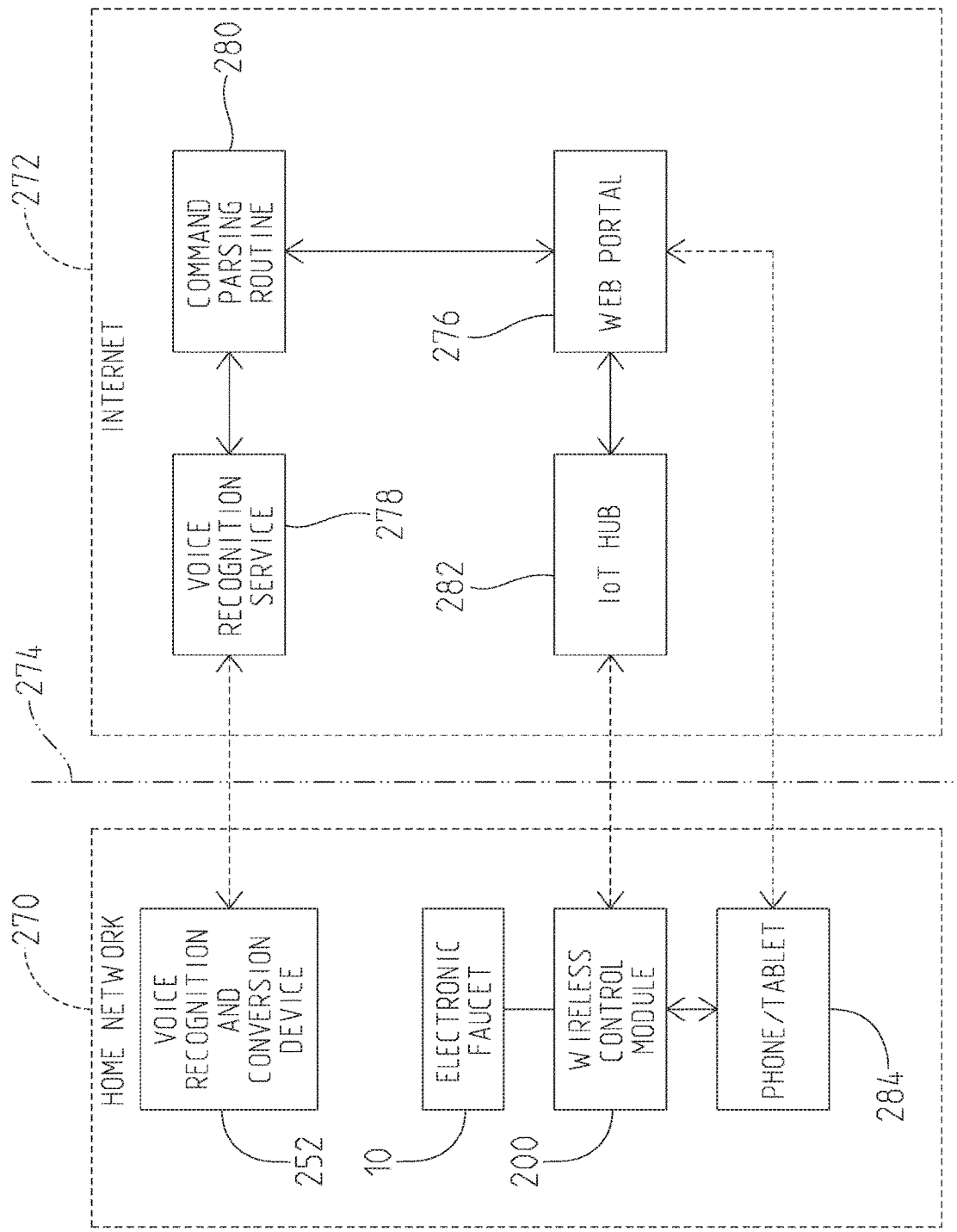
FIG. 9 is a diagrammatic representation of internet communication with the wireless control module of the present disclosure.

FIG. 9 is a diagrammatic representation of illustrative internet communication with the wireless control module 200. More particularly, the voice recognition and conversion device 252 and the wireless control module 200 may be part of a home network 270 that communicates wirelessly with software stored within the internet 272 (e.g., internet cloud) via a web interface 274. The web interface 274 may be of conventional design, such as a wireless router or hub, for facilitating communication between the internet cloud 272 and the home network 270. A web portal 276 illustratively provides communication between a voice recognition service 278 and a command parsing routine 280, and an internet of things (IoT) hub 282. Additionally, a dedicated remote use interface, such as a smart phone or tablet 284, may be in communication with the web portal 276. In another illustrative embodiment, the smart phone or tablet 284 can communicate directly with the wireless control module 200, for example, via a Soft AP Wi-Fi configuration.

Figure 10:
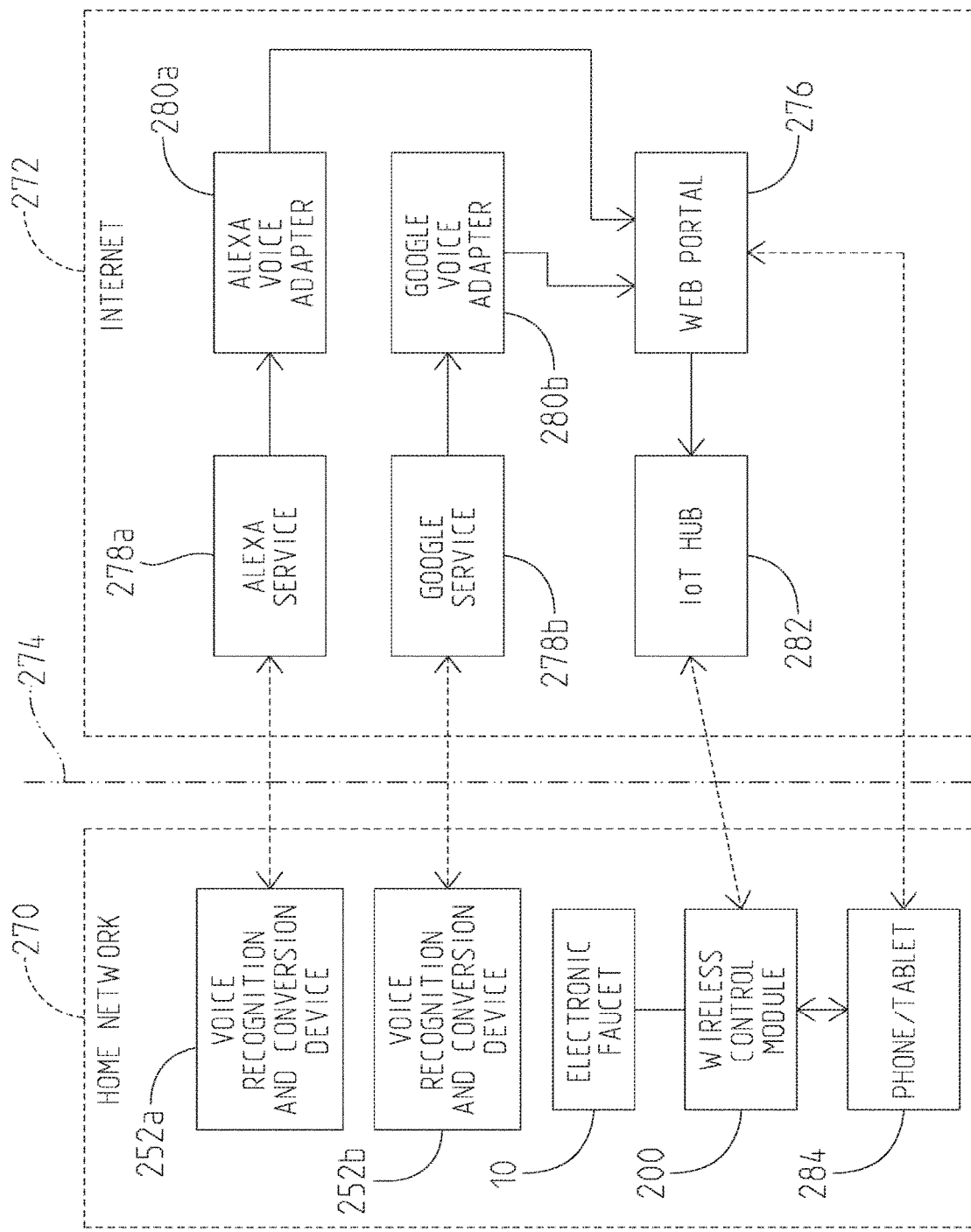
FIG. 10 is a diagrammatic representation of illustrative internet protocols for use with the wireless control module of the present disclosure.

FIG. 10 is a diagrammatic representation of illustrative internet protocols for use with the wireless control module 200. For example, voice recognition and conversion device 252a may comprise, for example, a voice or virtual assistant such as Alexa for use on devices (e.g., Echo) available from Amazon of Seattle, Washington USA. In such an illustrative embodiment, the device 252a is in communication with Alexa voice recognition service 278a and Alexa voice adapter 280a (e.g., AWS Lambda computing platform). In another illustrative embodiment, voice recognition and conversion device 252b may comprise, for example, a voice or virtual assistant such as Google Assistant available from Google of Mountain View, California USA. In such an illustrative embodiment, the device 252b is in communication with Google voice recognition service 278b and Google voice adapter 280b (e.g., Google cloud function).

With further reference to FIGS. 9 and 10, setup of the internet of things (IoT) hub 282 for communication with the controller 224 of the wireless control module 200 is illustratively provided by using only a webpage from a remote computing device, such as smart phone or tablet 284. More particularly, communications between the wireless control module 200 and the voice recognition and conversion device 252 are illustratively provided over the Wi-Fi network 270 and the internet 272 using standard internet protocols. A setup mechanism is provided for connecting the device 200 to the internet 272 without requiring the user to download a stand-alone application from a dedicated application store (e.g., the Apple App Store or Google Play Store).

Illustrative steps to setup device (e.g., wireless control module 200) are detailed below. The advantage of this setup system is that the user can use the web browser in his or her smart phone or tablet 284 to setup the device 200 without having to download a stand-alone 'app' for this one-time setup. In addition to the streamlined setup of the device 200, future configuration and control of the device 200 can occur thru a web portal, again employing the use of a built-in web browser in the user's smart phone or tablet 284.

An illustrative Wi-Fi web setup procedure includes the following steps:
1. The device 200 will host its own webserver and software access point (soft AP).
2. The user will connect to this soft AP by selecting this open Wi-Fi network on his or her smart phone or tablet 284.
3. The user will open his or her web browser and type in the IP address or url to the locally hosted webpage.
4. In the soft AP webpage, the user will be asked to select his or her home Wi-Fi SSID and enter his or her passkey.
5. At this point, the soft AP will shut down and the device will attempt to connect to the home Wi-Fi network 270 using the credentials the user entered. While this is happening, the webpage on the user's smart phone or tablet 284 will use asynchronous JavaScript (AJAX) to delay ~20 seconds (allowing the user's smart phone or tablet 284 to revert back to a stable internet connection on Wi-Fi or cellular) and then redirect to a globally resolvable web portal.
6. Once at the public web portal, the user will create an account to link his or her physical device (e.g. Wi-Fi voice faucet 10) to his or her account in the cloud.
7. Set-up finished. The user can now go back to the public web portal at any time to change settings for their device or remotely control their device (e.g., electronic faucet 10).

Figure 11:
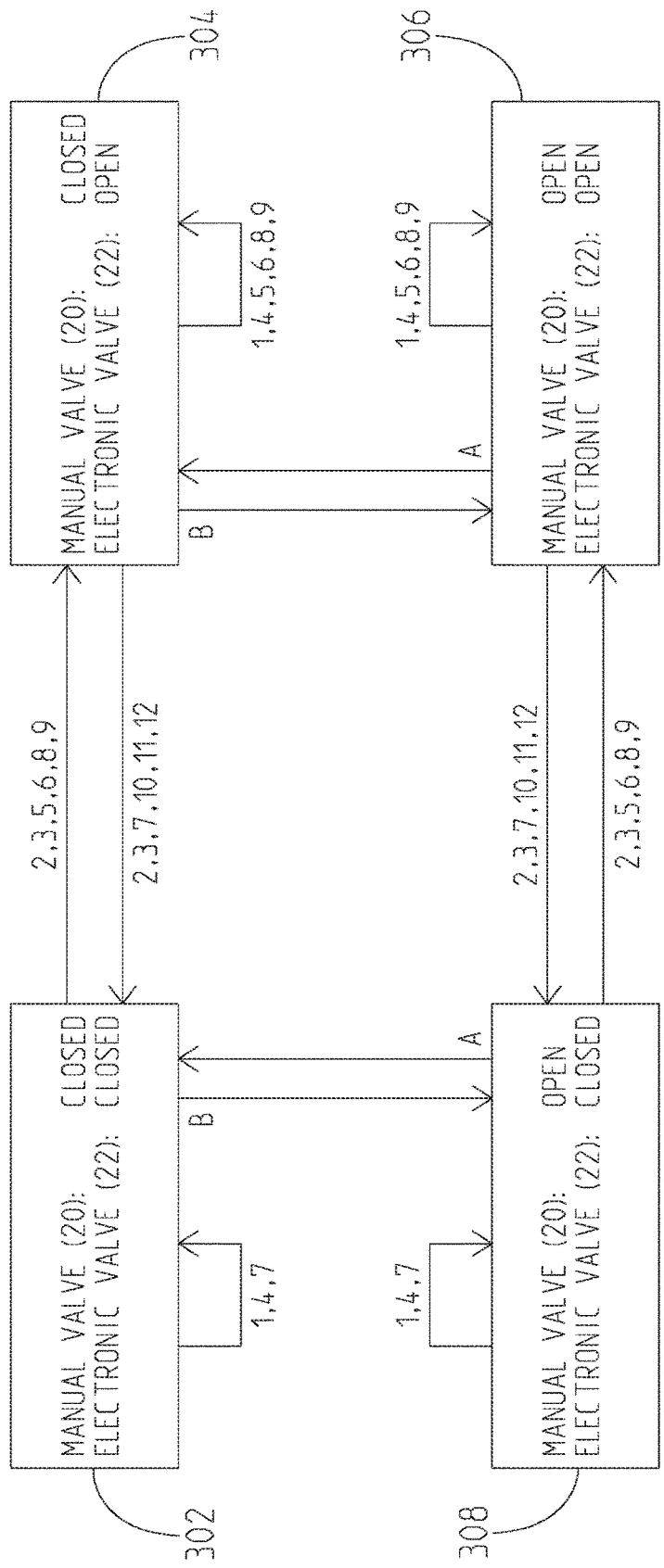
FIG. 11 is a state diagram illustrating exemplary operation of the electronic faucet of FIG. 1.

FIG. 11 is a state diagram showing an illustrative operation of the electronic faucet 10 of the present disclosure. Blocks 302, 304, 306 and 308 represent different operating states or modes of the illustrative electronic faucet 10. More particularly, block 302 represents a first state or mode of operation, where both the manual valve 20 and the electrically operable valve 22 are closed such that no water flows through the outlet 19 of the spout 12. Block 304 represents a second state or mode of operation, where the manual valve 20 is closed and the electrically operable valve 22 is open. No water flows through the outlet 19 of the spout 12 in the second mode of operation. Block 306 represents a third state or mode of operation, where both the manual valve 20 and the electrically operable valve 22 are open such that water flows through the outlet 19 of the spout 12. Block 308 represents a fourth state or mode of operation, where the manual valve 20 is open and the electrically operable valve 22 is closed. No water flows through the outlet 19 of the spout 12 in the fourth mode of operation.

In FIG. 11, various illustrative commands for controlling operation of the electrically operable valve 22 are represented by lines associated with various combinations of numbers 1 through 12. As further detailed herein, the valve controller 24 may receive commands from different inputs, such as capacitive sensor(s) 26 and/or voice recognition and conversion device 252. The valve controller 24 may also distinguish between a "tap" and a "grab" of different components of the electronic faucet 10 as a result of signals received from capacitive sensor(s) 26. More particularly, the valve controller 24 may make such a distinction based on the amount of time between positive and negative slopes of the capacitive signal. A longer duration indicates a "grab", while a shorter duration indicates a "tap". Illustratively, a grab is a contact or touch lasting at least 300 milliseconds, while a tap is a contact or touch lasting no more than 300 milliseconds. Additional illustrative details on distinguishing between touching of a spout 12 and/or a handle 14 to define a tap and a grab, identifying different patterns of touching, and implementing different functions as a result thereof, are disclosed in U.S. Pat. No. 8,776,817 to Sawaski et al., U.S. Pat. No. 8,613,419 to Rodenbeck et al., U.S. Pat. No. 8,561,626 to Sawaski et al., the disclosures of which are expressly incorporated herein by reference.

With further reference to the state diagram of FIG. 11, command 1 is no new input. Command 2 is spout tap, where the user touches the spout 12 of the faucet 10 for a predetermined time defining a tap. Command 3 is a hub tap, where the user touches the hub 15 of the faucet 10 for a predetermined time defining a tap. Command 4 is a spout grab, where the user touches the spout 12 for a predetermined time defining a grab. Command 5 is a hub grab, where the user touches the hub 15 for a predetermined time defining a touch. Command 6 is a voice ON command, where the user voices an audible "on" to the voice recognition and conversion device 252. Command 7 is a voice OFF command, where the user voices an audible "off" to the voice recognition and conversion device 252. Command 8 is a voice DISPENSE command, where the user voices an audible "dispense" to the voice recognition and conversion device 252. Command 9 is a voice WARM-UP command, where the user voices an audible "warm up" to the voice recognition and conversion device 252. Command 10 is a voice dispense complete command, which is initiated after the voice DISPENSE command (command 8), where the controller 24 moves the electrically operable valve 22 to a closed position following the dispensing of a predetermined amount of water as measured by the flow sensor 256. Command 11 is a warm-up complete command, which is initiated after the voice WARM-UP command (command 9), where the controller 24 moves the electrically operable valve 22 to a closed position after the water temperature as measured by the temperature sensor 264 exceeds a predetermined value. Command 12 is a time out command, where the controller 24 moves the electrically operable valve 22 to a closed position after the electrically operable valve 22 has been opened for a predetermined time.

With further reference to FIG. 11, illustrative manual inputs to the handle 14 of the manual valve 20 are represented by lines associated with letters A and B. Manual input A is placing the handle 14 of the manual valve 20 in an OFF position, such that no water flows through the manual valve 20. Manual input B is placing the handle 14 of the manual valve 20 in an ON position, such that water flows through the manual valve 20.

Commands for controlling operation of the electrically operable valve 22 may be initiated through a variety of inputs associated with the electronic faucet 10. Such inputs may include one or more of voice recognition, capacitive sensing, infrared (IR) sensing, proximity sensing, etc. Once a command is issued, the execution of the command illustratively occurs by using the controller 24 to keep track of elapsed time and reading of the sensors (e.g., flow sensor 52, 256, temperature sensor 54, 264, etc.) to control water flow. For capacitive sensing, the user may perform a touch sequence on a component of the electronic faucet 10 (e.g., a double tap on the spout 12), or combination touches on different components of the electronic faucet 10 (e.g., grab the spout 12 and move the manual handle 14 to hot, hold the spout 12 and double tap the manual handle 14, etc.).

In the operation illustrated in the state diagram of FIG. 11, the electronic faucet 10 may be controlled by commands input from both capacitive sensor(s) 26 and voice recognition supplied to the wireless control module 200. Beginning at state 302, commands 2 (spout tap), 3 (hub tap), 5 (hub grab), 6 (voice ON), 8 (voice DISPENSE), and 9 (voice WARM-UP), will cause the controller 24 to open the electrically operable valve 22 while the manual valve 20 remains closed. As such, the electronic faucet 10 is in state 304. The electronic faucet 10 remains in state 302 in response to commands 1 (no new input), 4 (spout grab), and 7 (voice OFF).

The electronic faucet 10 remains in state 304 in response to commands 1 (no new input), 4 (spout grab), 5 (hub grab), 6 (voice ON), 8 (voice DISPENSE), and 9 (voice WARM-UP). Commands 2 (spout tap), 3 (hub tap), 7 (voice OFF), 10 (voice DISPENSE), 11 (voice warm-up complete) and 12 (time out) return the electronic faucet 10 to state 302. From state 302, moving the manual handle 14 to the ON position (manual input B) causes the electronic faucet 10 to move to state 308.

From state 304, moving the manual handle 14 to the ON position (manual input B) causes the electronic faucet 10 to move to state 306. By moving the manual handle 14 back to the OFF position (manual input A), the electronic faucet 10 returns to state 304. At state 306, commands 2 (spout tap), 3 (hub tap), 7 (voice OFF), 10 (voice dispense complete), 11 (voice warm-up complete), and 12 (time out), will cause the controller 24 to close the electrically operable valve 22 while the manual valve 20 remains open. As such, the electronic faucet 10 is in state 308. The electronic faucet 10 remains in state 306 by commands 1 (no new input), 4 (spout grab), 5 (hub grab), 6 (voice ON), 8 (voice DISPENSE), and 9 (voice WARM-UP). Commands 2 (spout tap), 3 (hub tap), 5 (hub grab), 6 (voice ON), 8 (voice DISPENSE), and 9 (voice WARM-UP), return the electronic faucet 10 from state 308 to state 306.

The electronic faucet 10 remains in state 308 by commands 1 (no new input), 4 (spout grab), and 7 (voice OFF). From state 308, moving the manual handle 14 to the OFF position (manual input A) causes the electronic faucet 10 to move to state 302. By moving the manual handle 14 back to the ON position (manual input B) at state 302, the electronic faucet 10 returns to state 308.

It should be appreciated that a variety of different commands may be programmed for operation by the controller 24. For example, in response to a "wash hands" command, the controller 24 may (1) open the electrically operable valve 22 for a short, preset duration for the user to wet his hands, (2) close the electrically operable valve 22 for a short, preset duration for the user to apply soap, and (3) again open the electrically operable valve 22 for the user to rinse his hands. The controller 24 can again close the valve 22 after a short, preset duration, or only after an additional command input from the user. In this operation, the water dispensed may be set at a predetermined warm temperature (e.g., as detected by temperature sensor 54).

In response to a "brush teeth" command, the controller 24 may (1) open the electrically operable valve 22 for a short, preset duration for the user to wet his toothbrush, (2) close the electrically operable valve 22 for a short, preset duration for the user to apply toothpaste to the toothbrush, and (3) again open the electrically operable valve 22 for the user to rinse his mouth. The controller 24 can again close the valve 22 after a short, preset duration, or only after an additional command input from the user. In this operation, the water dispensed may be set at a predetermined cold temperature (e.g., as detected by temperature sensor 54). While the brush teeth mode is similar to the wash hands mode, the programmed times of operation and water temperatures are illustratively different.

In another illustrative example, a "fill object" command may cause the controller 24 to open the electrically operable valve 22 for a preset duration, or for a preset volume as measured by the flow sensor 256, for dispensing a set amount of water sufficient to fill a container, and then close the electrically operable valve 22. Different commands may be used to dispense different set amounts of water for filling different containers. Illustrative commands may include, for example, "fill cup", "fill pitcher", "fill gallon", etc.

A "warm up" command may cause the controller 24 to open the electrically operably valve 22 until the temperature of water dispensed (e.g., as detected by temperature sensor 54) meets or exceeds a predetermined value.

The various commands may be initiated through a variety of different inputs on the faucet 10 including, for example, voice input, capacitive sensors, infrared sensors, etc. For capacitive sensors 26, for example, the user may perform a touch sequence (e.g., double tap) or combination touch (e.g., hold the spout 12 and turn the handle 14 to warm, hold the spout 12, and double tap the handle 14). Once a command is issued, the execution of the command may occur using microprocessor 42 to keep track of elapsed time and reading of sensors (e.g., flow, temperature, etc.) to control water flow.

When the electronic faucet 10 is being controlled by voice recognition, then it is advantageous to reduce background noise supplied to the voice recognition and conversion device 252. As such, a laminar flow stream straightener may be provided in the flow path between the valve 22 and the outlet of the spout 12. In one illustrative embodiment, the laminar flow stream straightener may be an aerator coupled to the outlet 19 of the spout 12. More particularly, the aerated water may be forced through the holes or apertures in a dispersal disc and then forced through at least one screen which creates a laminar stream of aerated water as it exits from aerator. It may be appreciated that other types of stream straighteners may be used at a variety of locations in the flow path.

Data may be transmitted bi-directionally between the wireless control module 200 and the voice recognition and conversion device 252. More particularly, the device 200 and/or the voice recognition and conversion device 252 illustratively includes a speaker to convey information verbally to the user. For example, the device 200 and/or the voice recognition and conversion device 252 may provide information on the battery life of the unit, water temperature, warm-up feature, flow usage, water quality, water pressure, volume of water dispensed, desired temperatures set, custom object naming for volume that could be dispensed (e.g., cup, pitcher, etc.), custom object naming for other functions (temperature, quality, etc.), and set timer so that it would turn on/off at specified times.

While the above description illustrates the valve assembly and the wireless control module for use in connection with electronic faucet 10, such as a kitchen faucet, it should be appreciated that they may be used in connection with other devices, such as a shower valve, a bathtub valve, a toilet, etc.

Although the invention has been described in detail with reference to certain preferred embodiments, variations and modifications exist within the spirit and scope of the invention as described and defined in the following claims.

The invention claimed is:

1. An electronic faucet comprising: a spout; a fluid passageway supported by the spout; a valve assembly including an outer housing and an electrically operable valve disposed in the outer housing wherein the electrically operable valve is in fluid communication with the fluid passageway and positioned to control fluid flow through the fluid passageway; a valve controller disposed within the outer housing and being operative to control the electrically operable valve; a wireless control module in releasable electrical communication with the valve controller, the wireless control module including a housing with a wireless controller and a receiver disposed in the housing, the wireless control module being configured to receive wireless signals in response to operation of a remote transmitter and communicate with the valve controller to control operation of the electrically operable valve in response to the wireless signals, the wireless control module further including a sensor in electrical communication with the wireless controller and configured to sense a fluid property during operation of the electronic faucet; a waterway tube in fluid communication with the fluid passageway wherein both the housing of the wireless control module and the sensor are coupled with the waterway tube; wherein the valve assembly includes an auxiliary port in communication with the valve controller and the wireless control module includes a port in communication with the wireless controller and the releasable electrical communication between the wireless control module and the valve controller is provided by a cable having a first end connecter releasably coupled with the auxiliary port of the valve assembly and a second end connector releasably coupled with the port of the wireless control module; and wherein the remote transmitter includes a voice recognition and conversion device configured to cause the wireless signals as a result of audible input from a user.

2. The electronic faucet of claim 1, wherein the electrically operable valve comprises a solenoid valve including a solenoid coil and a moveable valve member operably coupled to the moveable valve member.

3. The electronic faucet of claim 1, wherein the receiver comprises a Wi-Fi chip configured to communicate with a Wi-Fi network.

4. The electronic faucet of claim 1, wherein the remote transmitter includes at least one of a smart phone, a tablet or a dedicated remote user interface in wireless communication with the receiver.

5. The electronic faucet of claim 1, wherein the wireless control module includes a body defining the waterway tube and wherein the waterway tube is in fluid communication with the valve assembly.

6. The electronic faucet of claim 5, wherein the wireless control module further includes a flow sensor received within the waterway tube and in communication with the valve controller.

7. The electronic faucet of claim 6, wherein the valve controller controls the electronically operable valve to dispense a predetermined amount of water based on input from the flow sensor.

8. The electronic faucet of claim 6, wherein the valve controller monitors water usage based on input from the flow sensor.

9. The electronic faucet of claim 5, wherein the wireless control module further includes a temperature sensor received within the waterway tube and in communication with the valve controller.

10. The electronic faucet of claim 5, wherein the body of the wireless control module is releasably coupled between an outlet of the valve assembly and the spout.

11. The electronic faucet of claim 10, further comprising a releasable coupler fluidly coupling together the valve assembly and the wireless control module.

12. The electronic faucet of claim 1, wherein the sensor is a flow sensor or a temperature sensor.

13. The electronic faucet of claim 1, wherein both the housing of the wireless control module and the sensor are coupled with the waterway tube between the valve assembly and the spout.

14. The electronic faucet of claim 13, wherein the waterway tube extends through a wall of the housing of the wireless control module.

15. The electronic faucet of claim 1, wherein the sensor is disposed within the housing of the wireless control module.

16. An electronic faucet comprising:
a spout;
a fluid passageway supported by the spout;
a valve assembly including an outer housing and an electrically operable valve disposed in the outer housing wherein the electrically operable valve is in fluid communication with the fluid passageway and positioned to control fluid flow through the fluid passageway;
a valve controller disposed within the outer housing and being operative to control the electrically operable valve;
a wireless control module including a housing with a wireless controller and a receiver disposed in the housing, the wireless control module being configured to receive wireless signals in response to operation of a remote transmitter and communicate with the valve controller to control operation of the electrically operable valve in response to the wireless signals, the wireless control module further including a sensor in electrical communication with the wireless controller and configured to sense a fluid property during operation of the electronic faucet;
a waterway tube in fluid communication with the fluid passageway wherein both the housing of the wireless control module and the sensor are coupled with the waterway tube between the valve assembly and the spout;
wherein the valve assembly includes an auxiliary port in communication with the valve controller and wireless control module includes a port in communication with the wireless controller;
a cable having a first end connector releasably coupled with the auxiliary port of the valve assembly and a second end connector releasably coupled with the port of the wireless control module provides releasable electrical communication between the wireless control module and the valve controller;
a library of different commands, wherein the different commands cause the valve controller to control flow rate and temperature of fluid dispensed from the spout;
wherein the commands include at least one of a warm up command, a wash hands command, a fill object command, and a brush teeth command; and
wherein the commands are audible commands.

17. The electronic faucet of claim 16, wherein the warm up command causes the valve controller to activate fluid flow until fluid temperature exceeds a predetermined value.

18. The electronic faucet of claim 16, wherein the wash hands command causes the valve controller to activate fluid flow for a first time, pause fluid flow for a second time, and then activate fluid flow.

19. The electronic faucet of claim 18, wherein the wash hands command further causes the valve controller to close the electrically operable valve to stop fluid flow after a third time duration.

20. The electronic faucet of claim 16, wherein the remote transmitter includes a voice recognition and conversion device configured to cause the wireless signals as a result of audible input from a user.

21. The electronic faucet of claim 20, wherein the remote transmitter includes at least one of a smart phone, a tablet or a dedicated remote user interface in wireless communication with the receiver.

22. The electronic faucet of claim 16, further comprising:
a capacitive sensor operably coupled to the spout and to the valve controller;
a voice recognition and conversion device operably coupled to the valve controller; and
wherein the valve controller is responsive to both the capacitive sensor and the voice recognition and conversion device when controlling operation of the electrically operable valve.

23. The electronic faucet of claim 16, wherein the sensor is a flow sensor or a temperature sensor.

24. The electronic faucet of claim 16, wherein the waterway tube extends through a wall of the housing of the wireless control module.

25. The electronic faucet of claim 16, wherein the sensor is disposed within the housing of the wireless control module.

26. An electronic faucet comprising: a spout; a fluid passageway supported by the spout; a valve assembly including an outer housing, a fluid conduit supported by the outer housing, and an electrically operable valve positioned to control fluid flow through the fluid passageway; a valve controller disposed within the outer housing and being operative to control the electrically operable valve in response to a plurality of commands including a wash hands command; wherein the wash hands command causes the valve controller to open the electrically operable valve to activate fluid flow for a first preset duration to allow a user to wet his hands, then to close the electrically operable valve to pause fluid flow for a second preset duration to allow the user to apply soap, then to open the electrically operable valve to again activate fluid flow for a third preset duration to allow the user to rinse his hands, and then to close the electrically operable valve to stop fluid flow after the third preset duration; a wireless control module including a housing with a wireless controller and a receiver disposed in the housing, the wireless control module being configured to receive wireless signals in response to operation of a remote transmitter and communicate with the valve controller to control operation of the electrically operable valve in response to the wireless signals, the wireless control module further including a sensor disposed within the housing of the wireless control module and in electrical communication with the wireless controller and configured to sense a fluid property during operation of the electronic faucet; a waterway tube in fluid communication with the fluid passageway wherein both the housing of the wireless control module and the sensor are coupled with the waterway tube; wherein the valve assembly includes an auxiliary port in communication with the valve controller and wireless control module includes a port in communication with the wireless controller; and a cable having a first end connector releasably coupled with the auxiliary port of the valve assembly and a second end connector releasably coupled with the port of the wireless control module provides releasable electrical communication between the wireless control module and the valve controller.

27. The electronic faucet of claim 26, wherein the remote transmitter includes a voice recognition and conversion device in wireless communication with the receiver.

28. The electronic faucet of claim 26, wherein the remote transmitter includes at least one of a smart phone, a tablet or a dedicated remote user interface in wireless communication with the receiver.

29. The electronic faucet of claim 26, wherein the wireless control module includes a body received within the housing and defines the waterway tube, the waterway tube being in fluid communication with the fluid conduit of the valve assembly.

30. The electronic faucet of claim 29, wherein the plurality of commands are stored in a library and are configured to cause the valve controller to control at least one of flow rate and temperature of fluid dispensed from the spout.

31. The electronic faucet of claim 29, wherein the plurality of commands further include at least one of a warm up command, a fill object command, and a brush teeth command.

32. The electronic faucet of claim 31, wherein the warm up command causes the valve controller to activate fluid flow until fluid temperature exceeds a predetermined value.

33. The electronic faucet of claim 29, further comprising a releasable coupler for fluidly coupling together the fluid conduit of the valve assembly and the body of the wireless control module.

34. The electronic faucet of claim 26, wherein the wash hands command is an audible input to a voice recognition and conversion device.

35. The electronic faucet of claim 26, further comprising:
a capacitive sensor operably coupled to the spout and to the valve controller;
a voice recognition and conversion device operably coupled to the valve controller; and
wherein the valve controller is responsive to both the capacitive sensor and the voice recognition and conversion device when controlling operation of the electrically operable valve.

36. The electronic faucet of claim 26, wherein the sensor is a flow sensor or a temperature sensor.

* * * * *